United States Patent
Sumikawa

(10) Patent No.: US 12,151,699 B2
(45) Date of Patent: Nov. 26, 2024

(54) DRIVING ASSISTANCE APPARATUS AND NON-TRANSITORY RECORDING MEDIUM

(71) Applicant: SUBARU CORPORATION, Tokyo (JP)

(72) Inventor: Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 151 days.

(21) Appl. No.: 17/887,065

(22) Filed: Aug. 12, 2022

(65) Prior Publication Data

US 2023/0081828 A1 Mar. 16, 2023

(30) Foreign Application Priority Data

Sep. 15, 2021 (JP) ................................ 2021-150098

(51) Int. Cl.
*B60W 50/14* (2020.01)
*B60W 40/09* (2012.01)
*B60W 50/00* (2006.01)
*G06F 3/16* (2006.01)

(52) U.S. Cl.
CPC ............ *B60W 50/14* (2013.01); *B60W 40/09* (2013.01); *B60W 50/0098* (2013.01); *G06F 3/165* (2013.01); *B60W 2050/143* (2013.01)

(58) Field of Classification Search
CPC .. B60W 50/14; B60W 40/09; B60W 50/0098; B60W 2050/143; G06F 3/165
USPC ........................................................ 340/439
See application file for complete search history.

(56) References Cited

U.S. PATENT DOCUMENTS

| | | | | |
|---|---|---|---|---|
| 8,924,074 B2 * | 12/2014 | Komori | ................. | B60W 50/10 705/3 |
| 2004/0036601 A1 * | 2/2004 | Obradovich | ............ | B60C 23/20 340/425.5 |
| 2005/0047614 A1 * | 3/2005 | Herberger | .............. | H04H 60/04 381/119 |
| 2008/0271541 A1 * | 11/2008 | Neuman | ................ | G07C 5/085 73/767 |
| 2010/0198456 A1 * | 8/2010 | Komori | ................. | B60W 40/09 701/33.4 |
| 2012/0215412 A1 * | 8/2012 | Seymour | ................... | B60T 7/22 701/1 |
| 2014/0018974 A1 * | 1/2014 | Okita | ........................ | G06F 7/00 701/1 |
| 2015/0047495 A1 * | 2/2015 | Neitzke | .................... | G10H 1/18 84/609 |

(Continued)

FOREIGN PATENT DOCUMENTS

JP 2012-198344 A 10/2012

*Primary Examiner* — Zhen Y Wu
(74) *Attorney, Agent, or Firm* — Rimon P.C.

(57) ABSTRACT

A driving assistance apparatus to be applied to a vehicle is configured to present behavior stability of the vehicle to a driver who drives the vehicle by means of an auditory stimulus. The driving assistance apparatus includes one or more processors and one or more memories. The one or more memories are communicably coupled to the one or more processors. The one or more processors are configured to determine the behavior stability of the vehicle on the basis of information indicating behavior of the vehicle, and output the auditory stimulus while varying the auditory stimulus every time the vehicle travels a predetermined time period or a predetermined section in a state in which the behavior stability is high.

9 Claims, 15 Drawing Sheets

(56) References Cited

U.S. PATENT DOCUMENTS

| | | | |
|---|---|---|---|
| 2015/0308072 A1* | 10/2015 | Taylor | E02F 3/422 |
| | | | 701/50 |
| 2016/0009295 A1* | 1/2016 | Chun | A61B 5/18 |
| | | | 701/32.9 |
| 2017/0045171 A1* | 2/2017 | Chioccola | F16L 39/04 |
| 2017/0267241 A1* | 9/2017 | Matsunaga | B60W 50/08 |
| 2019/0001881 A1* | 1/2019 | You | B60Q 5/008 |
| 2019/0248285 A1* | 8/2019 | You | B60Q 9/008 |
| 2021/0031793 A1* | 2/2021 | Stayton | H04W 4/46 |
| 2021/0114619 A1* | 4/2021 | Mimura | B62D 6/00 |
| 2021/0124360 A1* | 4/2021 | MacDonald | G05D 1/0214 |
| 2021/0343268 A1* | 11/2021 | Loh | H04R 3/00 |
| 2022/0101752 A1* | 3/2022 | Sumikawa | G07C 5/0833 |
| 2022/0135055 A1* | 5/2022 | Kim | A61B 5/165 |
| | | | 701/36 |
| 2022/0242395 A1* | 8/2022 | Sawada | B60W 10/26 |

* cited by examiner

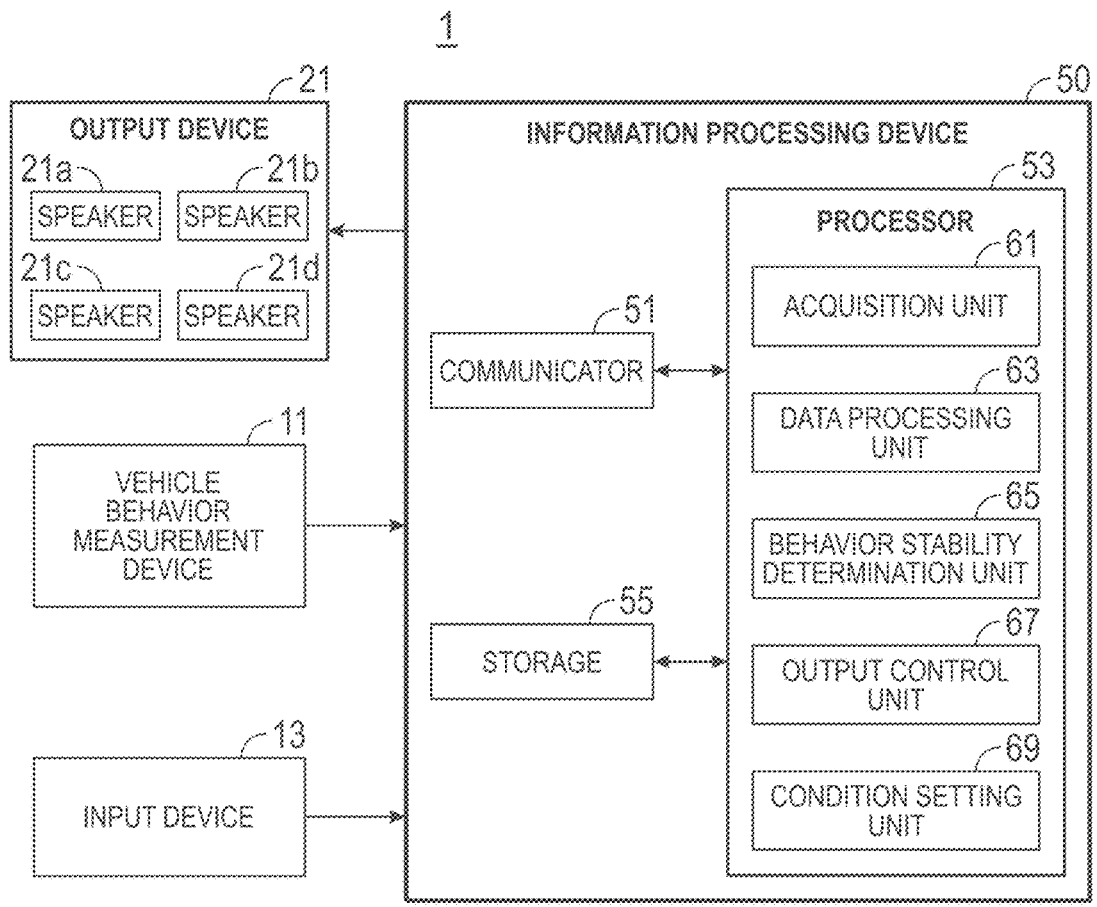
FIG. 2
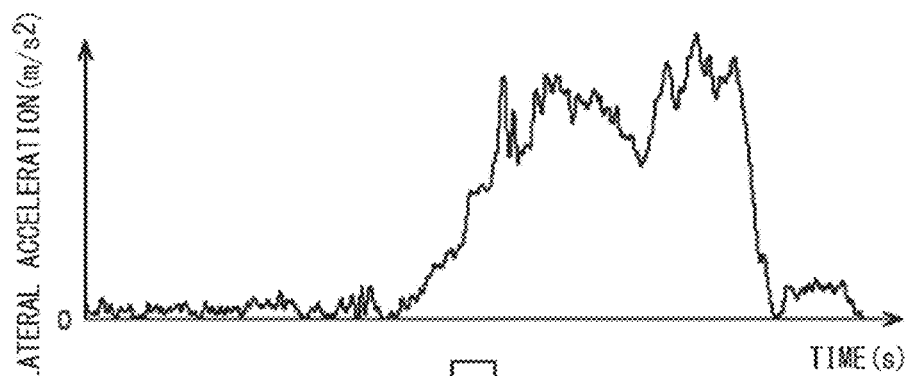
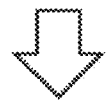
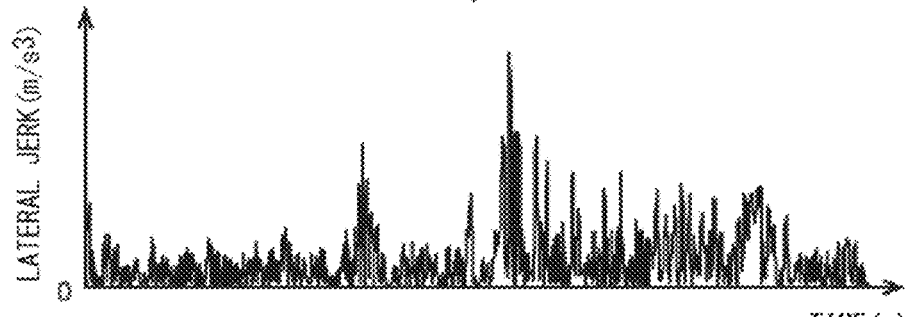
FIG. 3

| | AGE OF DRIVER | ELDERLY AGE | THRESHOLD: LARGE (REFERENCE NUMBER OF TIMES: LARGE) | NUMBER OF KINDS OF DATA: DECREASE |
|---|---|---|---|---|
| DRIVER ATTRIBUTE INFORMATION | NUMBER OF YEARS ELAPSED AFTER OBTAINING LICENSE | LONG ↕ SHORT | THRESHOLD: SMALL (REFERENCE NUMBER OF TIMES: SMALL) ↕ THRESHOLD: LARGE (REFERENCE NUMBER OF TIMES: LARGE) | NUMBER OF KINDS OF DATA: INCREASE ↕ NUMBER OF KINDS OF DATA: DECREASE |
| | DRIVING FREQUENCY | HIGH ↕ LOW | THRESHOLD: SMALL (REFERENCE NUMBER OF TIMES: SMALL) ↕ THRESHOLD: LARGE (REFERENCE NUMBER OF TIMES: LARGE) | NUMBER OF KINDS OF DATA: INCREASE ↕ NUMBER OF KINDS OF DATA: DECREASE |
| | BLANK YEARS | LONG | THRESHOLD: LARGE (REFERENCE NUMBER OF TIMES: LARGE) | NUMBER OF KINDS OF DATA: DECREASE |

FIG. 8

DRIVING ASSISTANCE APPARATUS AND NON-TRANSITORY RECORDING MEDIUM

CROSS-REFERENCE TO RELATED APPLICATIONS

The present application claims priority from Japanese Patent Application No. 2021-150098 filed on Sep. 15, 2021, the entire contents of which are hereby incorporated by reference.

BACKGROUND

The technology relates to a driving assistance apparatus and a non-transitory recording medium that improve a vehicle driving operation skill of a driver who drives a vehicle.

Levels of vehicle driving operations vary from driver to driver. The level of driving operation influences ride comfort and traffic safety. In this regard, various devices have been proposed that determine a driving operation performed by a driver, notify the driver of the determination result of the driving operation, and present advice to the driver.

For example, Japanese Unexamined Patent Application Publication (JP-A) No. 2012-198344 proposes a driving assistance apparatus that accurately determines a driving operation state of a driver, enables the driver to obtain information about a comprehensive evaluation of the driving operation state of current driving, and enables the driver to improve a technique of a driving operation in next driving. For example, JP-A No. 2012-198344 discloses a driving assistance apparatus including: a variation calculation unit configured to calculate a first related value related to variation of acceleration; a jerk calculation unit configured to calculate a second related value related to a jerk; a state determination unit configured to determine, on the basis of the first related value and the second related value, whether a driving state is lithe or shaky in accordance with a preset determination criterion by using a vibration model; and a comprehensive determination unit configured to calculate a score for a determination result in current driving determined by the state determination unit, calculate a first evaluation index by dividing the score by a number of times of determination in the current driving performed by the state determination unit, and calculate a comprehensive evaluation score for a driving operation state in the current driving on the basis of the first evaluation index.

SUMMARY

An aspect of the technology provides a driving assistance apparatus to be applied to a vehicle. The driving assistance apparatus is configured to present behavior stability of the vehicle to a driver who drives the vehicle by means of an auditory stimulus. The driving assistance apparatus includes one or more processors and one or more memories. The one or more memories are communicably coupled to the one or more processors. The one or more processors are configured to determine the behavior stability of the vehicle on the basis of information indicating behavior of the vehicle, and output the auditory stimulus while varying the auditory stimulus every time the vehicle travels a predetermined time period or a predetermined section in a state in which the behavior stability is high.

An aspect of the technology provides a driving assistance apparatus to be applied to a vehicle. The driving assistance apparatus is configured to present behavior stability of the vehicle to a driver who drives the vehicle by means of an auditory stimulus. The driving assistance apparatus includes a behavior stability determination unit and an output control unit. The behavior stability determination unit is configured to determine the behavior stability of the vehicle on the basis of information indicating behavior of the vehicle. The output control unit is configured to output the auditory stimulus while varying the auditory stimulus every time the vehicle travels a predetermined time period or a predetermined section in a state in which the behavior stability is high.

An aspect of the technology provides a non-transitory recording medium containing a computer program to be applied to a driving assistance apparatus. The driving assistance apparatus is configured to present behavior stability of a vehicle to a driver who drives the vehicle by means of an auditory stimulus. The computer program causes, when executed by one or more processors, the one or more processors to implement a method. The method includes: determining the behavior stability of the vehicle on the basis of information indicating behavior of the vehicle; and outputting the auditory stimulus while varying the auditory stimulus every time the vehicle travels a predetermined time period or a predetermined section in a state in which the behavior stability is high.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 2 is a block diagram illustrating a configuration example of the driving assistance apparatus according to one example embodiment of the technology.

FIG. 3 is an explanatory diagram illustrating an example of a data conversion process performed by the driving assistance apparatus according to one example embodiment.

FIG. 8 is an explanatory diagram illustrating an example of a condition setting according to one example embodiment.

DETAILED DESCRIPTION

Figure 1:
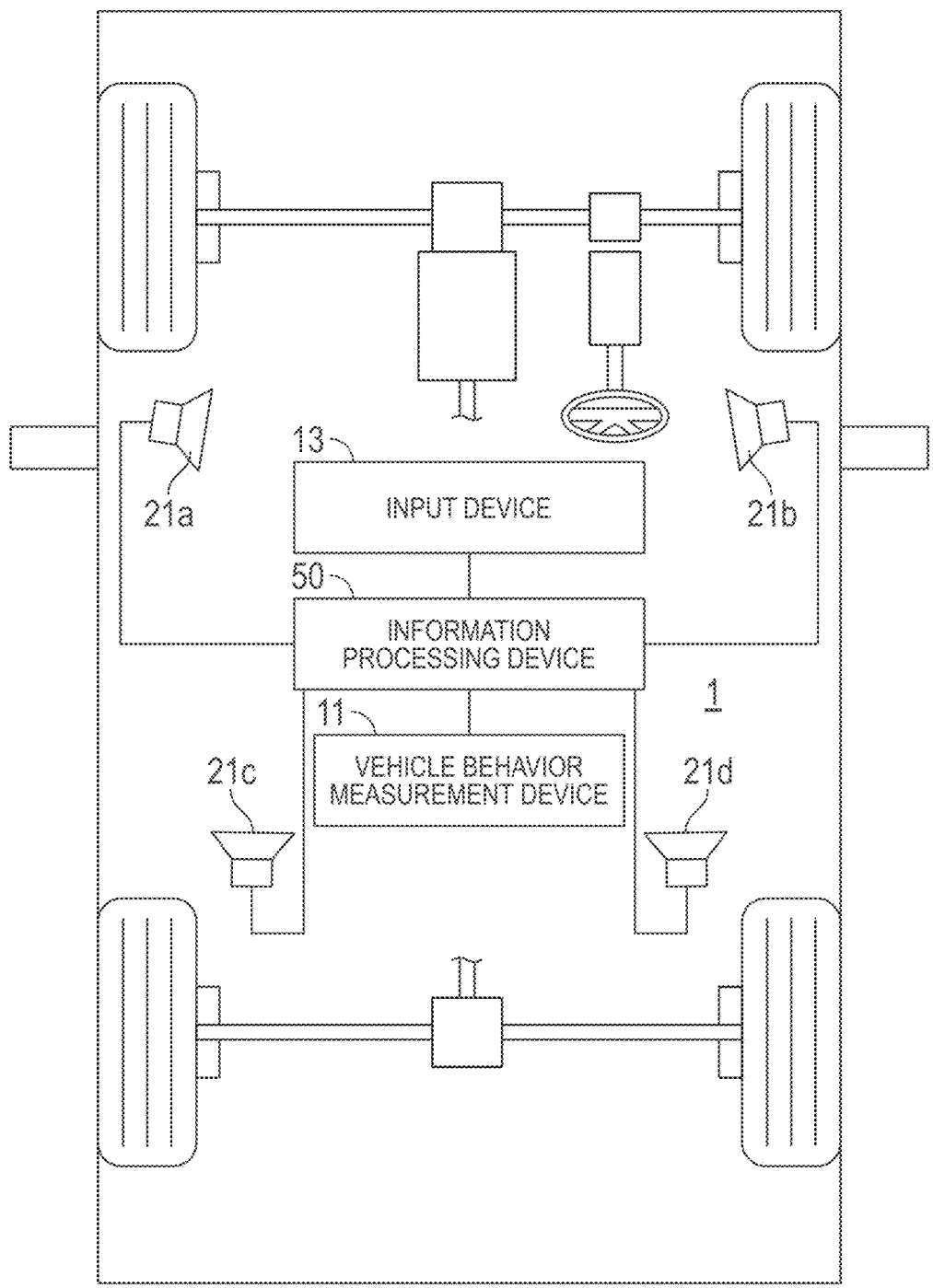
FIG. 1 is a schematic view of a vehicle to which a driving assistance apparatus according to one example embodiment of the technology is applied.

A driving assistance apparatus described in JP-A No. 2012-198344 evaluates a series of driving operations performed during current driving. It is thus difficult for a driver to understand a driving operation performed at which time point, in particular, has been evaluated. On the other hand, in a case where an evaluation result or advice about a driving operation is presented to the driver during driving by text of a voice or by an image display, there is a risk that the driver's attention to the surroundings of a vehicle may be lowered when the driver confirms the evaluation result or contents of the advice. Further, it is also conceivable to issue a notification to the driver when behavior of the vehicle becomes unstable during driving of the driver; however, this can give the driver such an impression as to deny the driving of the driver, and can reduce a driving-skill-enhancing effect for a driver whose willingness to improve the driving skill is low.

It is desirable to provide a driving assistance apparatus that is able to notify a driver during driving of information related to an evaluation of a driving operation performed by the driver in such a manner as to give no impression of denying the driving of the driver and to suppress a decrease in attention of the driver.

In the following, some example embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

1. First Example Embodiment 1-1. Outline of Driving Assistance Apparatus

First, an outline of a driving assistance apparatus according to a first example embodiment of the technology will be described. The driving assistance apparatus may acquire information indicating behavior of a vehicle while the vehicle is traveling, may perform determining of behavior stability of the vehicle on the basis of the acquired information, and may output a predetermined sound in accordance with a result of the determining. The behavior of the vehicle may mainly reflect a steering operation state, an accelerator operation state, and a brake operation state of a driver who drives the vehicle. This makes it possible for the driver to recognize an evaluation of his/her own driving operation state in real time and intuitively by means of an auditory stimulus.

The driving assistance apparatus according to the example embodiment outputs the auditory stimulus while varying the auditory stimulus every time the vehicle travels a predetermined time period or a predetermined section in a state in which the behavior stability is high. This makes it possible for the driver to recognize the evaluation of the driving operation of the traveling vehicle in real time and intuitively by means of the auditory stimulus. Further, the auditory stimulus may vary in a case where the behavior stability of the vehicle is high, which provides the driver with no impression of denying the driving of the driver. In addition, the auditory stimulus may vary sequentially as the behavior stability of the vehicle continues to be high for a longer time. Thus, the driver does not become too used to the stimulus in the case where the behavior stability of the vehicle is high, and the driver is able to maintain the willingness to improve his/her driving skill.

1-2. Configuration Example of Driving Assistance Apparatus

First, with reference to FIGS. 1 and 2, a configuration example of a driving assistance apparatus 1 according to the first example embodiment of the technology will be described. FIG. 1 is a schematic view of a vehicle to which the driving assistance apparatus 1 is applied. FIG. 2 is a block diagram illustrating an example of a configuration of the driving assistance apparatus 1.

The driving assistance apparatus 1 may include an information processing device 50. The information processing device 50 may include, for example, one or more processors, and one or more memories communicably coupled to the one or more processors. Non-limiting examples of the one or more processors may include a central processing unit (CPU). Non-limiting examples of the memory may include a random access memory (RAM) and a read only memory (ROM). A part of or all of the information processing device 50 may include a component that is updatable, such as firmware, or may each be, for example, a program module to be executed by a command from the one or more processors.

The information processing device 50 may operate as a device that controls operation of the driving assistance apparatus 1 by the one or more processors executing a computer program. The computer program may be a computer program that causes the one or more processors to execute an operation to be executed by the information processing device 50, which will be described later. The computer program to be executed by the one or more processors may be recorded in a non-transitory recording medium serving as a storage 55 included in the information processing device 50, or may be recorded in a non-transitory recording medium built in the information processing device 50 or any non-transitory recording medium externally attachable to the information processing device 50. In one embodiment, the storage 55 may serve as the "memory".

Examples of the non-transitory recording medium that records a computer program may include: a magnetic medium such as a hard disk, a floppy disk, or a magnetic tape; an optical recording medium such as a compact disk read only memory (CD-ROM), a digital versatile disk (DVD), or Blu-ray (registered trademark); a magneto-optical medium such as a floptical disk; a memory such as a RAM or a ROM; a flash memory such as a universal serial bus (USB) memory; and another medium that is able to store a program.

The driving assistance apparatus 1 may further include a vehicle behavior measurement device 11, an input device 13, and an output device 21. The vehicle behavior measurement device 11, the input device 13, and the output device 21 may each be communicably coupled to the information processing device 50 via a dedicated line or a communication bus such as a controller area network (CAN).

[1-2-1. Vehicle Behavior Measurement Device]

The vehicle behavior measurement device 11 may measure information indicating behavior of a vehicle. The vehicle behavior measurement device 11 may include, for example, at least one of a vehicle speed sensor, an acceleration sensor, or an angular velocity sensor. The vehicle speed sensor may detect, for example, a rotating speed of a driving shaft of a vehicle. The acceleration sensor may detect at least a longitudinal acceleration and a lateral acceleration. The longitudinal acceleration is an acceleration in a longitudinal direction of the vehicle, and the lateral acceleration is an acceleration in a width direction of the vehicle. The acceleration sensor may further detect a vertical acceleration which is an acceleration in a height direction of the vehicle. The angular velocity sensor may detect: a rate of change of a rotation angle (roll angle) around an axis in the longitudinal direction of the vehicle; a rate of change of a rotation angle (pitch angle) around an axis in the width direction of the vehicle; and a rotation angle (yaw angle) around an axis in the height direction of the vehicle. The angular velocity sensor may be a yaw rate sensor that detects the rate of change of the yaw angle.

Data measured by the vehicle behavior measurement device 11 may be data that can be varied depending on a steering operation, an accelerator operation, or a brake operation performed by the driver, and may be transmitted to the information processing device 50 as information indicating the behavior of the vehicle. The information processing device 50 may be configured to acquire the information measured by the vehicle behavior measurement device 11. The vehicle behavior measurement device 11 may also include a sensor that is able to measure data that reflects the behavior of the vehicle, in addition to the vehicle speed sensor, the acceleration sensor, and the angular velocity sensor.

[1-2-2. Input Device]

The input device 13 may accept operation input of a user and transmit the operation input to the information processing device 50. The input device 13 may be, for example, a touch panel display or a dial operation device. Alternatively, the input device 13 may be a voice recognition device that accepts an input by a voice of an occupant, or may be an image recognition device that accepts an input by a gesture.

In the example embodiment, the input device 13 may accept input of information about an attribute of the driver. The information about the attribute of the driver may be information related to a driving skill of the driver, and may include at least one of the following pieces of information, for example: an age of the driver, the number of years elapsed after obtaining a license, driving frequency, and the number of years elapsed after driving the last time. In addition, other information on the basis of which it is possible to estimate the driving skill of the driver may be included. Those pieces of information may be entered in a form of a questionnaire answered by the driver or another person to a question presented by the information processing device 50, or data in which the information is determined or stored may be entered in advance.

The input device 13 may also accept input of information of a desired sound as an output sound. For example, the input device 13 may be configured in such a manner that the driver or another person is able to select a desired sound from among timbres or types of sounds presented by the information processing device 50. In one example, a kind of musical instrument sound or sound effect to be outputted may be selectable. Data of a sound to be selected may be stored in the storage 55 of the information processing device 50 in advance; however, the sound data may be updated or added by communicating with, for example, an external server.

Note that the input device 13 may be unnecessary in a case where a control condition is not changed depending on the attribute of the driver, or the output sound is non-selectable.

[1-2-3. Output Device]

The output device 21 may output a sound that is recognizable to the driver. The output device 21 may be a speaker provided in the vehicle, or may be a speaker dedicated to the driving assistance apparatus 1. In the example embodiment, the output device 21 may be configured as a speaker system including multiple speakers 21a to 21d provided in the vehicle. The information processing device 50 may control the output of the output device 21, and the output device 21 may cause the driver to recognize the behavior stability of the vehicle by means of the auditory stimulus.

[1-2-4. Information Processing Device]

The information processing device 50 may include a communicator 51, a processor 53, and the storage 55. The processor 53 may include an acquisition unit 61, a data processing unit 63, a behavior stability determination unit 65, an output control unit 67, and a condition setting unit 69. The processor 53 may be a processor such as a CPU. The acquisition unit 61, the data processing unit 63, the behavior stability determination unit 65, the output control unit 67, and the condition setting unit 69 may each be implemented by executing a program by the processor. Parts of the acquisition unit 61, the data processing unit 63, the behavior stability determination unit 65, the output control unit 67, and the condition setting unit 69 may each include an analogue circuit.

[Storage]

The storage 55 may include one or more memories such as a RAM or a ROM. The storage 55 may store, for example, a program to be executed by the processor 53, various parameters to be used for executing the program, data that has been acquired, and data of a result obtained by calculation.

[Communicator]

The communicator 51 may be an interface configured to transmit and receive data and a signal to and from the vehicle behavior measurement device 11, the input device 13, and the output device 21.

[Acquisition Unit]

The acquisition unit 61 of the processor 53 may acquire information transmitted from the vehicle behavior measurement device 11 and the input device 13 via the communicator 51. The information to be acquired by the acquisition unit 61 may include information indicating the behavior of the vehicle outputted from the vehicle behavior measurement device 11. The acquisition unit 61 may acquire the information at a predetermined calculation cycle and store the acquired information in the storage 55.

[Data Processing Unit]

The data processing unit 63 of the processor 53 may execute a predetermined data process on the information indicating the behavior of the vehicle acquired by the acquisition unit 61. In one example, the data processing unit 63 may execute at least one of a smoothing process, an absolute value conversion process, or a differential process with respect to acquired measurement data of a vehicle speed, an acceleration (the longitudinal acceleration, the lateral acceleration, or the vertical acceleration), or an angular velocity (angular velocity of the yaw angle, the roll angle, or the pitch angle), thereby calculating an index value which indicates a magnitude of the behavior of the vehicle.

For example, the data processing unit 63 may execute the smoothing process, the absolute value conversion process, and the differential process with respect to the measurement data of the vehicle speed, the acceleration, or the angular velocity, thereby calculating: an absolute value of the acceleration; a jerk of the absolute value of the acceleration, i.e., a jerk; or a jerk of an absolute value of the angular velocity, i.e., an angular acceleration. The calculated absolute value of the acceleration, the angular velocity, the jerk, or the angular acceleration may increase as the magnitude of the behavior of the vehicle increases, whereas the value may decrease as the magnitude of the behavior of the vehicle decreases. The calculated absolute value may be used as an index value indicating the magnitude of the behavior of the vehicle. Of those, the absolute value of the jerk or the angular acceleration may be used as the index value. This may reduce an influence of change in the vehicle speed, the acceleration, or the angular velocity due to an influence of a track of a traveling course or acceleration and deceleration of another vehicle. This makes it possible to more accurately evaluate variation in the behavior of the vehicle attributed to the driving operation state of the driver.

FIG. 3 is an explanatory diagram illustrating an example of a data conversion process performed by the data processing unit 63. FIG. 3 illustrates an example of calculating, as the index value indicating the magnitude of the behavior of the vehicle, a value of a lateral jerk determined on the basis of the measurement data of the lateral acceleration detected by the acceleration sensor serving as one example of the vehicle behavior measurement device 11. In one example, the data processing unit 63 may execute the smoothing process and the absolute value conversion process with respect to the measurement data of the lateral acceleration detected by the acceleration sensor, thereby converting the data into data of the absolute value of the lateral acceleration. Further, the data processing unit 63 may execute a temporal differential process with respect to the data of the absolute value of the lateral acceleration, convert the measurement data of the lateral acceleration into data of the absolute value of the lateral jerk, and use the converted data as the index value.

The data processing unit 63 may calculate one index value by using multiple pieces of data selected from the respective absolute values of the acceleration, the angular velocity, the jerk, or the angular acceleration. In this case, the data processing unit 63 may replace the values of the individual pieces of data to be used with values of a single index (e.g., values between 0 and 100), and may use, as the index value, an average value of the values of all pieces of data to be used that have been replaced with the values of the single index. In this case, respective kinds of the individual pieces of data may be weighted.

The example embodiment describes an example in which the data processing unit 63 acquires the measurement data of the lateral acceleration detected by the acceleration sensor and calculates the lateral jerk as the index value indicating the magnitude of the behavior of the vehicle.

[Behavior Stability Determination Unit]

The behavior stability determination unit 65 of the processor 53 may execute a process of determining the behavior stability of the vehicle while the driver drives the vehicle. In the example embodiment, the behavior stability determination unit 65 may determine the behavior stability of the vehicle by comparing the index value indicating the magnitude of the behavior of the vehicle calculated during traveling of the vehicle with a predetermined threshold set by the condition setting unit 69. In one example, in the example embodiment, the behavior stability determination unit 65 may determine that the behavior stability of the vehicle is low if the number of times the index value has exceeded the predetermined threshold reaches a predetermined reference number of times.

The behavior stability determination unit 65 may generate a trigger signal as command information that causes the auditory stimulus to vary every time the vehicle travels a predetermined time period or a predetermined section in a state in which the behavior stability is high. In other words, the behavior stability determination unit 65 may generate the trigger signal for varying the auditory stimulus every time the predetermined time period or the predetermined section has passed, without the number of times the index value has exceeded the predetermined threshold reaching the predetermined reference number of times after starting the count of the predetermined time period or the predetermined section. The count of the predetermined time period or the predetermined section may be reset and the predetermined time period or the predetermined section may be increased again, when the predetermined time period or the predetermined section has passed and when the number of times the index value has exceeded the predetermined threshold reaches the predetermined reference number of times.

The predetermined time period or the predetermined section used for determining whether the behavior stability of the vehicle is maintained at a high state may be, for example, a time period divided on the basis of a traveling time, a section divided for each traveling distance, or a section divided for each intersection where a traffic light is installed. While the vehicle is in the state in which the behavior stability is kept high, the auditory stimulus may be varied for each of such time periods or sections. This may lead the driver to continue driving operation in which the behavior stability of the vehicle is high, while preventing the driver from becoming used to the continuously outputted stimulus.

The predetermined time period or the predetermined section may be a specific section that is set in advance. In one example embodiment, used for evaluating stability of the steering operation state of the driver may be a straight section where a straight line continues a predetermined distance or more, or a turning section where a curve having a constant curvature continues. In one example embodiment, used for evaluating the accelerator operation state or the brake operation state of the driver may be a straight section where a straight line continues a predetermined distance or more. Further, the predetermined time period or the predetermined section may be a section classified in terms of, for example, a municipality, a speed limit, or a road type (e.g., an ordinary road, a city highway, an intercity highway, etc.). It may be possible to determine whether the vehicle has traveled through those specific sections on the basis of position information of the vehicle detected by a position finding system such as a global positioning system (GPS) and map data of a navigation system.

The behavior stability determination unit 65 may use one threshold to determine the behavior stability, or may use multiple thresholds to determine a level of the behavior stability. In a case where one threshold is used to determine the behavior stability, the behavior stability determination unit 65 may determine that the behavior stability has decreased when the number of times the index value has exceeded the threshold reaches the reference number of times. Alternatively, in a case where two thresholds are used to determine the behavior stability, the behavior stability determination unit 65 may determine a degree of decrease in the behavior stability on the basis of which of the thresholds has been exceeded the reference number of times. The respective values of the thresholds may be different from each other. In this case, the behavior stability determination unit 65 may vary a way the auditory stimulus is varied by generating different trigger signals on the basis of which of the thresholds has been exceeded the reference number of times.

The threshold used for determining the behavior stability of the vehicle may be a variable value set on the basis of a level of a driving skill of an individual driver. With a decrease in the threshold, the magnitude of the behavior of the vehicle has to be smaller to increase the behavior stability. This makes it possible to lead the behavior of the vehicle to be further stabler. Instead of the threshold, or in combination with the threshold, the reference number of times that is used to determine the behavior stability of the vehicle may also be set on the basis of the level of the driving skill of the driver. A method of setting the threshold that is used for determining the behavior stability of the vehicle on the basis of the level of the driving skill of the driver will be described in detail in the following item of "condition setting unit 69".

Figure 4:
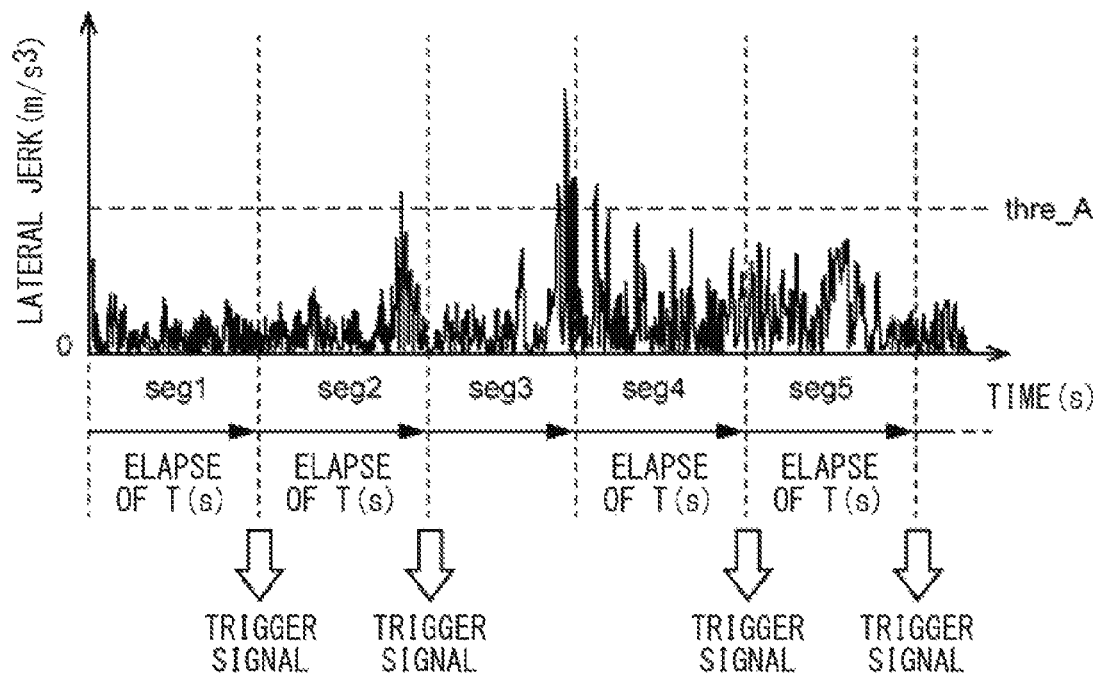
FIG. 4 is an explanatory diagram illustrating an example of a behavior stability determination process according to one example embodiment.

FIG. 4 is an explanatory diagram illustrating an example of a process performed by the behavior stability determination unit 65. FIG. 4 illustrates an example of generating a trigger signal for varying the auditory stimulus every time the vehicle travels the predetermined time period (i.e., time) in the state in which the behavior stability is high.

As illustrated in FIG. 4, the behavior stability determination unit 65 may determine whether the absolute value of the lateral jerk serving as the index value exceeds a threshold thre_A during driving of the vehicle. The behavior stability determination unit 65 may count the number of times the index value has exceeded the threshold thre_A for each of time periods seg1 to seg5. In the example illustrated in FIG. 4, the reference number of times is set to four, which causes the behavior stability of the vehicle to be determined to be low if the number of times the index value has exceeded the threshold thre_A reaches four.

In each of the first time period seg1 and the fifth time period seg5, a predetermined time period T may have passed without the index value exceeding the threshold thre_A. The behavior stability determination unit 65 may thus generate the trigger signal when the first time period seg1 has passed and the trigger signal when the fifth time period seg5 has passed. In the second time period seg2 and the fourth time period seg4, the predetermined time period T may have passed without the number of times the index value has exceeded the threshold thre_A reaching four. The behavior stability determination unit 65 may thus generate the trigger signal when the second time period seg2 has passed and the trigger signal when the fourth time period seg4 has passed. In contrast, in the third time period seg3, the number of times the index value has exceeded the threshold thre_A reaches four before the predetermined time period T passes. The behavior stability determination unit 65 may thus reset the count of the predetermined time period T at a time point at which the number of times the index value has exceeded the threshold thre_A reaches four and may start the count again.

The trigger signal may be generated when the number of times the index value has exceeded the threshold thre_A reaches the reference number of times, and not when the index value has exceeded the threshold thre_A once. This may allow the behavior stability determination unit 65 to determine that the behavior stability of the vehicle is maintained high in a case where, even if the behavior of the vehicle increases for a moment, the magnitude of the behavior of the vehicle is kept small as a whole over each time period. This makes it possible for the driver to easily achieve a sense of accomplishment.

Figure 5:
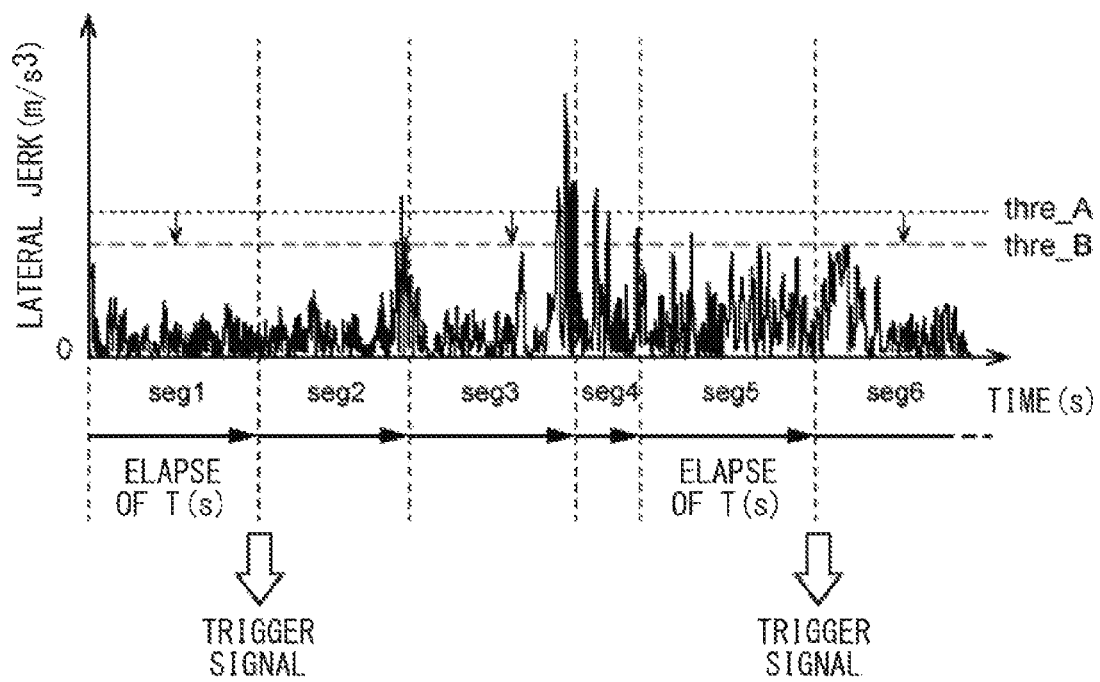
FIG. 5 is an explanatory diagram illustrating an example of varying a threshold depending on a driving skill of a driver according to one example embodiment.

FIG. 5 illustrates an example in which a threshold thre_B smaller than the threshold thre_A used in FIG. 4 is set in a case where the driving skill of the driver is high. In this case, even if the value (index value) of the lateral jerk is the same as that of FIG. 4, the number of times the index value has exceeded the threshold thre_B reaches four before the predetermined time period T passes not only in the third time period seg3 but also in the second time period seg2 and the fourth time period seg4. The behavior stability determination unit 65 may thus reset the count of the predetermined time period T at a time point at which the number of times the index value has exceeded the threshold thre_B reaches four and may start the count again. Thus, for the driver whose driving skill is high, the number of times the auditory stimulus varies decreases even if the index value indicates the same variation. This makes the driver whose driving skill is high increase the willingness to cause the auditory stimulus to vary, thereby increasing the willingness to improve his/her driving skill.

[Output Control Unit]

The output control unit 67 of the processor 53 may execute a process of driving the output device 21 and outputting the auditory stimulus. In one example, the output control unit 67 may continuously output the auditory stimulus from one or more sound sources after start of the process of outputting the auditory stimulus, and vary the auditory stimulus on the basis of the trigger signal generated by the behavior stability determination unit 65. As a result, the auditory stimulus is outputted while being varied every time the vehicle travels the predetermined time period or the predetermined section in the state in which the behavior stability is high. This allows the driver to recognize that the behavior stability of the vehicle is maintained high, and to maintain the willingness to improve his/her driving skill.

For example, the output control unit 67 may continuously output an auditory stimulus of a predetermined pattern outputted from the one or more sound sources after the start of the process of outputting the auditory stimulus, and may vary an output pattern each time the behavior stability determination unit 65 generates the trigger signal. The output pattern may be outputted from the one or more sound sources in accordance with a rule that has been set in advance. Varying the output pattern outputted from the sound sources may include, for example, varying at least one of respective volumes (including turning on and off of the output), respective output timings, output order, or respective pitches, of the sound sources. Varying the output pattern outputted from the sound sources may also include increasing the number of sound sources.

The auditory stimulus to be outputted may be a sound that does not give a sense of discomfort to the driver, for example, a chord including multiple sounds having different pitches, different kinds, or different tones. However, the auditory stimulus to be outputted may not be limited to these examples, and may be, for example, a medal winning sound, a clapping sound, or a firework sound. In a case where such an auditory stimulus is outputted, the output pattern may be varied by, for example, varying the number of medals to be won, the number of clappers, or the number of fireworks, or by varying the volume or the pitch. Further, in a case where the auditory stimulus is the medal winning sound, the clapping sound, or the firework sound, the speed of the outputted sound may be varied.

In order not to give a sense of discomfort or an uncomfortable feeling to the driver even in a case where the auditory stimulus to be outputted is varied, the auditory stimulus to be outputted may be, for example, a combination of a sound of a basic pattern whose output pattern does not vary and a sound of a varied pattern whose output pattern varies. In this case, the output control unit 67 may vary the output pattern of the sound of the varied pattern while outputting the sound of the basic pattern with a rhythm and a tempo kept constant. Note that the rhythm and the tempo may be examples of elements to be varied in the auditory stimulus perceived by a human, such as beats of periodic progression of the auditory stimulus to be outputted or a length of each beat. Other elements of the auditory stimulus may be varied as well.

Figures 6, 7:
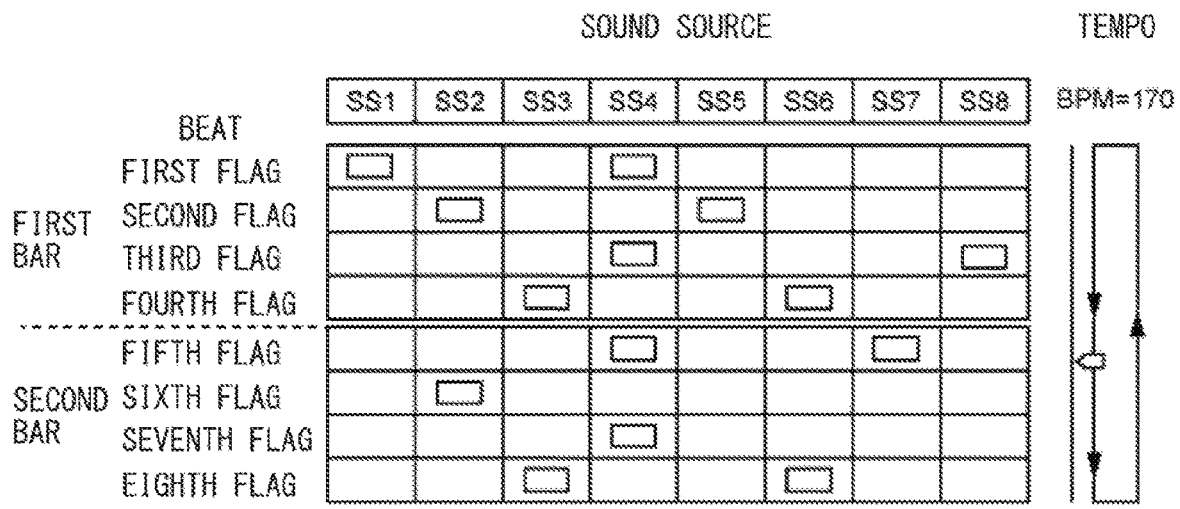
FIG. 6 is an explanatory diagram illustrating an example of an output pattern of an auditory stimulus according to one example embodiment.
FIG. 7 is an explanatory diagram illustrating an example of setting an output pattern of an auditory stimulus according to one example embodiment.

FIGS. 6 and 7 are each an explanatory diagram illustrating an example of an output pattern of the auditory stimulus. In the respective examples illustrated in FIGS. 6 and 7, the output control unit 67 may repeatedly output eight sound sources SS1 to SS8 with eighth note rhythm using the eight sound sources SS1 to SS8. The auditory stimulus may be a drum sound including, for example, the eight sound sources SS1 to SS8, i.e., an open hi-hat, a closed hi-hat, a clap, a kick (bass drum), a snare, a tam-tam, a crash cymbal, and a ride cymbal.

FIG. 6 illustrates output timings of the respective sound sources SS1 to SS8. The output pattern illustrated in FIG. 6 may be set in such a manner that the sound source SS4 is the kick, for example, and may be set as a so-called four-on-the-floor pattern or an eighth note rhythm pattern. First to eighth flags corresponding to respective beats may be set, the first to fourth flags may configure a first bar, and the fifth to eighth flags may configure a second bar.

FIG. 7 illustrates data that sets the output timing and the volume of each of the sound sources SS1 to SS8. A value of each cell may indicate the volume of each of the sound sources SS1 to SS8 to be outputted on each beat. As for the volume, "0" may mean a mute state and "1" may mean a maximum volume. As illustrated in FIG. 7, four sound sources, i.e., the sound sources SS1 to SS4, may be set as sound sources of the basic pattern that does not vary regardless of the behavior stability of the vehicle, whereas four sound sources, i.e., the sound sources SS5 to SS8 may be set sound sources of the varied pattern that vary appropriately in a case where the vehicle travels the predetermined time period in the state in which the behavior stability is high.

In other words, an output volume in each beat of each of the sound sources SS5 to SS8 of the varied pattern may vary in units of 0.1 from "0" to "1" in accordance with the trigger signal generated by the behavior stability determination unit 65. In addition to the respective output volumes of the sound sources SS5 to SS8, it may be possible to vary the respective output timings and the output order of the sound sources SS5 to SS8 depending on whether the output volume in each beat is set to "0" or "0.1 to 1.0" for each of the sound sources SS5 to SS8.

Instead of varying the output pattern of the sound sources SS5 to SS8 of the varied pattern in accordance with the trigger signal generated by the behavior stability determination unit 65, or in combination with the variation of the output pattern, the tempo, or beats per minute (BPM), of the auditory stimulus as a whole including the basic pattern and the varied pattern may be varied. A way of varying the auditory stimulus on the basis of the trigger signal may be set randomly or may be set in advance by a computer program.

[Condition Setting Unit]

The condition setting unit 69 of the processor 53 may set a condition for the behavior stability determination unit 65 to determine the behavior stability. In the example embodiment, the condition setting unit 69 may set a threshold for determining the behavior stability of the vehicle on the basis of information about the attribute of the driver entered from the input device 13.

In one example, the condition setting unit 69 may set the threshold on the basis of information related to the driving skill of the driver acquired as the information about the attribute of the driver. The condition setting unit 69 may set the threshold to a smaller value as the level of the driving skill to be estimated increases, and may set the threshold to a larger value as the level of the driving skill to be estimated decreases. Thus, for a driver whose driving skill is high and who keeps the behavior of the vehicle stable, for example, the threshold may be set to a smaller value. In order for such a driver to be determined that the behavior stability is high, the behavior of the vehicle has to be further smaller than that of a driver whose driving skill is low. Accordingly, it is possible to lead the driver whose driving skill is high to make the behavior of the vehicle be further stabler. In contrast, it is possible to lead the driver whose driving skill is low to make the behavior stability be in an appropriate level depending on the driving skill of the driver.

As the information about the attribute of the driver related to the driving skill of the driver, at least one of the following pieces of information acquired via the input device 13 may be used: the age of the driver, the number of years elapsed after obtaining the license, the driving frequency, and the number of years elapsed after driving the last time. In other words, in a case where the age of the driver belongs to an elderly age of 70 years and older, for example, the threshold may be increased, because there is a high possibility that the driving skill is decreasing. With an increase in the number of years elapsed after obtaining the license, the threshold may be decreased, because the driving skill is estimated to be high. With an increase in the driving frequency, the threshold may be decreased, because the driving skill is estimated to be high. With an increase in the number of years elapsed after driving the last time (blank years), the threshold may be increased, because there is a high possibility that the driving skill is decreasing.

Further, the condition setting unit 69 may adjust the threshold on the basis of data of the behavior stability during the previous driving of the same driver, together with the data acquired via the input device 13. For example, the condition setting unit 69 may use information of the number of times or the frequency that the index value calculated by the data processing unit 63 has exceeded the threshold during the previous driving of the same driver. In this case, the driving skill may be estimated to be higher as the number of times the index value has exceeded the threshold decreases or as the frequency that the index value has exceeded the threshold decreases. The threshold may thus be decreased.

Further, the condition setting unit 69 may set, on the basis of the information about the attribute of the driver, the reference number of times to be used for calculating the index value indicating the magnitude of the behavior of the vehicle by the data processing unit 63. The reference number of times may be set instead of the threshold for determining the behavior stability of the vehicle, or may be set in combination with the threshold. In one example, the condition setting unit 69 may decrease the reference number of times as the level of the driving skill of the driver estimated on the basis of the information about the attribute of the driver increases, and may increase the reference number of times as the level of the driving skill of the driver estimated on the basis of the information about the attribute of the driver decreases. Thus, in order for a driver whose driving skill is high and who keeps the behavior of the vehicle stable to be determined that the behavior stability is high, the behavior of the vehicle has to be maintained to be small as compared with a driver whose driving skill is low. Accordingly, it is possible to lead the driver whose driving skill is high to make the behavior of the vehicle be further stabler. In contrast, it is possible to lead the driver whose driving skill is low to make the behavior stability be in an appropriate level depending on the driving skill of the driver.

In addition, the condition setting unit 69 may set a condition of data processing to be performed by the data processing unit 63 on the basis of the information about the attribute of the driver. For example, the condition setting unit 69 may set, on the basis of the information about the attribute of the driver described above, the number of kinds of data to be used in calculating the index value. The index value may be calculated by the data processing unit 63. The index value may indicate the magnitude of the behavior of the vehicle. In one example, the condition setting unit 69 may increase the number of kinds of data to be used in calculating the index value as the level of the driving skill of the driver estimated on the basis of the information about the attribute of the driver increases, and may decrease the number of kinds of data to be used in calculating the index value as the level of the estimated driving skill of the driver decreases. Thus, for a driver whose driving skill is high and who keeps the behavior of the vehicle stable, the behavior stability may be determined on the basis of more kinds of data, which makes it possible to lead the driver whose driving skill is high to make the behavior of the vehicle be further stabler. In contrast, for a driver whose driving skill is low, the behavior stability may be determined on the basis of relatively small number of kinds of data, which makes it possible to lead the driver whose driving skill is low to make the behavior stability be in an appropriate level depending on the driving skill of the driver.

Also in a case of increasing or decreasing the number of kinds of data to be used for calculating the index value, the steering operation state of the driver may be easily evaluated by preferentially using data of the lateral jerk or the angular acceleration of the yaw angle regardless of the number of kinds of data to be used. The accelerator operation state and the brake operation state of the driver may be easily evaluated by preferentially using data of the longitudinal jerk or the angular acceleration of the roll angle.

FIG. 8 is an explanatory diagram illustrating an example of a method of setting the threshold and the reference number of times on the basis of the information about the attribute of the driver and a method of increasing or decreasing the number of kinds of data to be used for calculating the index value.

As illustrated in FIG. 8, in a case where the age of the driver belongs to an elderly age that is over a preset age, the threshold may be increased by a predetermined number and the number of kinds of data to be used for calculating the index value may be decreased. Further, with an increase in the number of years elapsed after obtaining the license, the threshold may be decreased by a predetermined number and the number of kinds of data to be used to calculate the index value may be increased. In contrast, with a decrease in the number of years elapsed after obtaining the license, the threshold may be increased by a predetermined number and the number of kinds of data to be used for calculating the index value may be decreased. Still further, with an increase in the driving frequency, the threshold may be decreased by a predetermined number and the number of kinds of data to be used to calculate the index value may be increased. In contrast, with a decrease in the driving frequency, the threshold may be increased by a predetermined number and the number of kinds of data to be used for calculating the index value may be decreased. In addition, with an increase in the number of years elapsed after driving the last time (blank years), the threshold may be increased by a predetermined number and the number of kinds of data to be used for calculating the index value may be decreased.

For example, in a case of evaluating the behavior stability using one threshold, the condition setting unit 69 may increase or decrease the threshold on the basis of the information about the attribute of the driver with respect to a reference value of the threshold that is set in advance, and may increase or decrease the number of kinds of data. For example, in a case where the index value is to be calculated as an index value within a range from 0 to 100, the reference value of the threshold may be set to 50, and the threshold may be increased or decreased by multiplying the reference value by a coefficient of less than 1 (one) or a coefficient of greater than 1 (one) on the basis of each piece of the information. Alternatively, in a case where data usable for evaluating the behavior stability is set to the following 12 items, i.e., the longitudinal acceleration, the lateral acceleration, the vertical acceleration, the angular velocity of the yaw angle, the angular velocity of the pitch angle, the angular velocity of the roll angle, the longitudinal jerk, the lateral jerk, the vertical jerk, the angular acceleration of the yaw angle, the angular acceleration of the pitch angle, and the angular acceleration of the roll angle, the number of pieces of data to be used as the reference may be set to 5, and the number of pieces of data may be increased or decreased by one on the basis of each piece of information, thereby setting the number of pieces of data to be used. Note that the threshold and the number of kinds of data may be increased or decreased within respective ranges between maximum values and minimum values that have been set in advance. Thus, the conditions for the data processing performed by the data processing unit 63 and the behavior stability determination process performed by the behavior stability determination unit 65 may be set.

Increasing or decreasing the threshold may be replaced with increasing or decreasing the reference number of times. Alternately, both the threshold and the reference number of times may be varied. The coefficients to be used for increasing or decreasing the threshold or increasing or decreasing the reference number of times, or the number by which the number of kinds of data is increased or decreased may be constant regardless of the information, or may be weighted in accordance with the information.

1-3. Processing Operation Performed by Driving Assistance Apparatus

Heretofore, the configuration example of the driving assistance apparatus 1 according to the example embodiment has been described. Next, a processing operation performed by the driving assistance apparatus 1 will be described in accordance with some specific examples. In the following, an example will be described in which the auditory stimulus is outputted by the output pattern of the auditory stimulus illustrated in FIGS. 6 and 7, while being varied every time the vehicle travels the predetermined time period (time) in the state in which the behavior stability is high.

Figure 9:
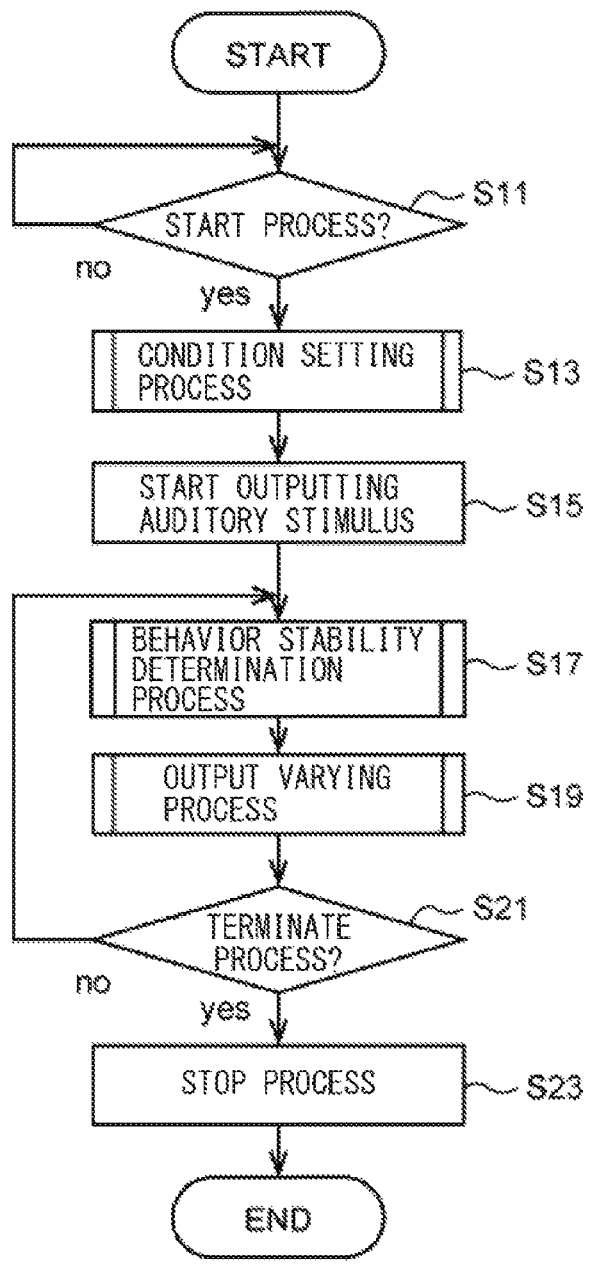
FIG. 9 is a flowchart illustrating a main routine of a control process according to one example embodiment.

FIG. 9 is a flowchart illustrating a main routine of a process performed by the processor 53 of the information processing device 50.

First, the processor 53 may determine whether to start executing a process of presenting the behavior stability of the vehicle to the driver by means of the auditory stimulus, which is hereinafter also referred to as "auditory stimulus outputting process" (step S11). A condition for starting the auditory stimulus outputting process may not be particularly limited. For example, in a case where the auditory stimulus outputting process is performed at all times while the vehicle driving system is in action, the processor 53 may determine that the execution of the auditory stimulus outputting process is to be started when the driving system is activated. Alternatively, the processor 53 may determine that the execution of the auditory stimulus outputting process is to be started when the processor 53 detects that the driver is seated in a driver's seat on the basis of a signal outputted from a driver imaging camera or a load sensor installed in the driver's seat. Further, in a case where an occupant such as a driver is able to switch on/off of the execution of the auditory stimulus outputting process, the processor 53 may determine that the execution of the auditory stimulus outputting process is to be started when the execution of the auditory stimulus outputting process is switched from off to on.

If the processor 53 does not determine that the execution of the auditory stimulus outputting process is to be started (S11/no), the processor 53 may repeatedly execute the determination process of step S11. If the processor 53 determines that the execution of the auditory stimulus outputting process is to be started (S11/yes), the processor 53 may execute a condition setting process (step S13).

Figure 10:
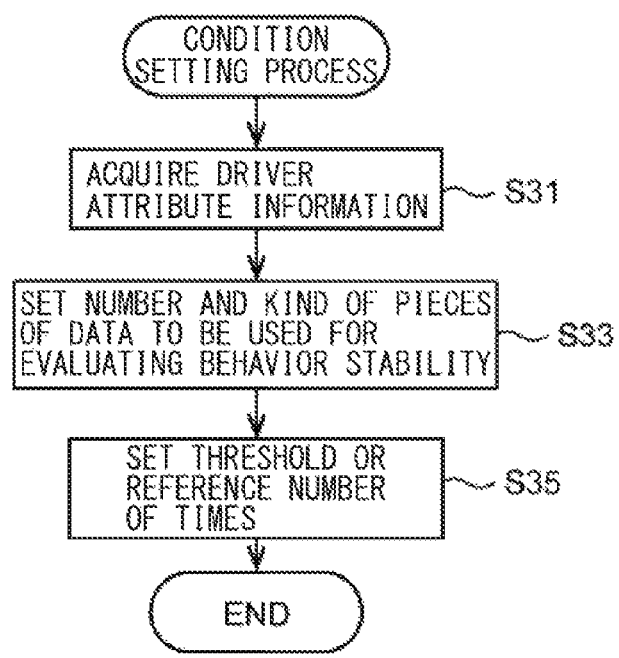
FIG. 10 is a flowchart of a condition setting process according to one example embodiment.

FIG. 10 is a flowchart illustrating a routine of the condition setting process. In the condition setting process, first, the acquisition unit 61 may acquire the information about the attribute of the driver transmitted from the input device 13 (step S31). For example, the acquisition unit 61 may acquire at least one of the following pieces of information: the age of the driver, the number of years elapsed after obtaining the license, the driving frequency, and the number of years elapsed after driving the last time. Those pieces of information may be entered in a form of a questionnaire answered by the driver or another person to a question presented by the information processing device 50, or data in which the information is determined or stored may be entered in advance. The acquisition unit 61 may also acquire from the storage 55 data of an evaluation of a previous driving operation state of the same driver.

Thereafter, the condition setting unit 69 may set the number and the kind of pieces of data to be used for determining the behavior stability of the vehicle on the basis of the acquired information about the attribute of the driver (step S33). In the example embodiment, the number of pieces of data to be used for determining the behavior stability may be set in accordance with the setting example illustrated in FIG. 8. For example, the usable data may be set to the following 12 items, i.e., the longitudinal acceleration, the lateral acceleration, the vertical acceleration, the angular velocity of the yaw angle, the angular velocity of the pitch angle, the angular velocity of the roll angle, the longitudinal jerk, the lateral jerk, the vertical jerk, the angular acceleration of the yaw angle, the angular acceleration of the pitch angle, and the angular acceleration of the roll angle, and the number of pieces of data to be used for determining the behavior stability may be set among these pieces of data.

According to the setting example illustrated in FIG. 8, the number of pieces of data to be used may be increased as the driving skill of the driver is estimated to be higher on the basis of the information about the attribute of the driver, whereas the number of pieces of data to be used may be decreased as the driving skill of the driver is estimated to be lower. For example, the condition setting unit 69 may set the number of pieces of data to be used by adding or subtracting 1 (one) for each piece of information with the minimum number set to 1 (one), the maximum number set to 12, and the reference value set to 5. In this case, the condition setting unit 69 may set, as data to be preferentially used, the longitudinal jerk, the lateral jerk, the angular acceleration of the yaw angle, and the angular acceleration of the pitch angle, which reflect even more the driving operation state of the driver. Alternatively, the condition setting unit 69 may set, as data to be used, data corresponding to a behavior to be evaluated which is one of behavior of the vehicle in the longitudinal direction or behavior of the vehicle in the lateral direction.

Thereafter, the condition setting unit 69 may set the threshold thre_A on the basis of the acquired information about the attribute of the driver (step S35). In the example embodiment, the threshold thre_A may be set in accordance with the setting example illustrated in FIG. 8. In a case where one index value is to be calculated by using multiple pieces of data, the pieces of data to be used may be replaced with values of a single index (e.g., values between 0 and 100), and an average value of the values of all pieces of data to be used may be set as the index value. The condition setting unit 69 may set the reference value of the threshold thre_A to 50, and may determine the threshold thre_A by multiplying the reference value by a coefficient of greater than 1 (one) or a coefficient of less than 1 (one) for each piece of information. However, the method of determining the index value and the method of setting the threshold thre_A in a case where multiple pieces of data are used may not be limited to this example.

According to the setting example illustrated in FIG. 8, the threshold thre_A may be set to a smaller value as the driving skill of the driver is estimated to be higher on the basis of the information about the attribute of the driver, whereas the threshold thre_A may be set to a larger value as the driving skill of the driver is estimated to be lower on the basis of the information about the attribute of the driver. Reference number of times C0 may also be set instead of the threshold thre_A or in combination with the threshold thre_A. In this case, the reference number of times C0 may be set to a smaller value as the driving skill of the driver is estimated to be higher on the basis of the information about the attribute of the driver, whereas the reference number of times C0 may be set to a larger value as the driving skill of the driver is estimated to be lower on the basis of the information about the attribute of the driver.

Note that if the driver is able to select a kind of sound of the auditory stimulus to be outputted, the condition setting unit 69 may set a kind of sound of the auditory stimulus to the selected kind of sound. As described above, the kind of sound of the auditory stimulus in the example embodiment may be set to the auditory stimulus of the drum sound illustrated in FIGS. 6 and 7.

Returning to FIG. 9, after the condition setting process in step S13, the output control unit 67 of the processor 53 may start outputting the auditory stimulus (step S15). The output control unit 67 may start outputting the auditory stimulus in the output pattern of sound sources SS1 to SS8 that is set in advance, or may optionally set the output pattern of the auditory stimulus at a beginning of outputting. An output control process will be described in detail later in combination with an output varying process.

Figure 11:
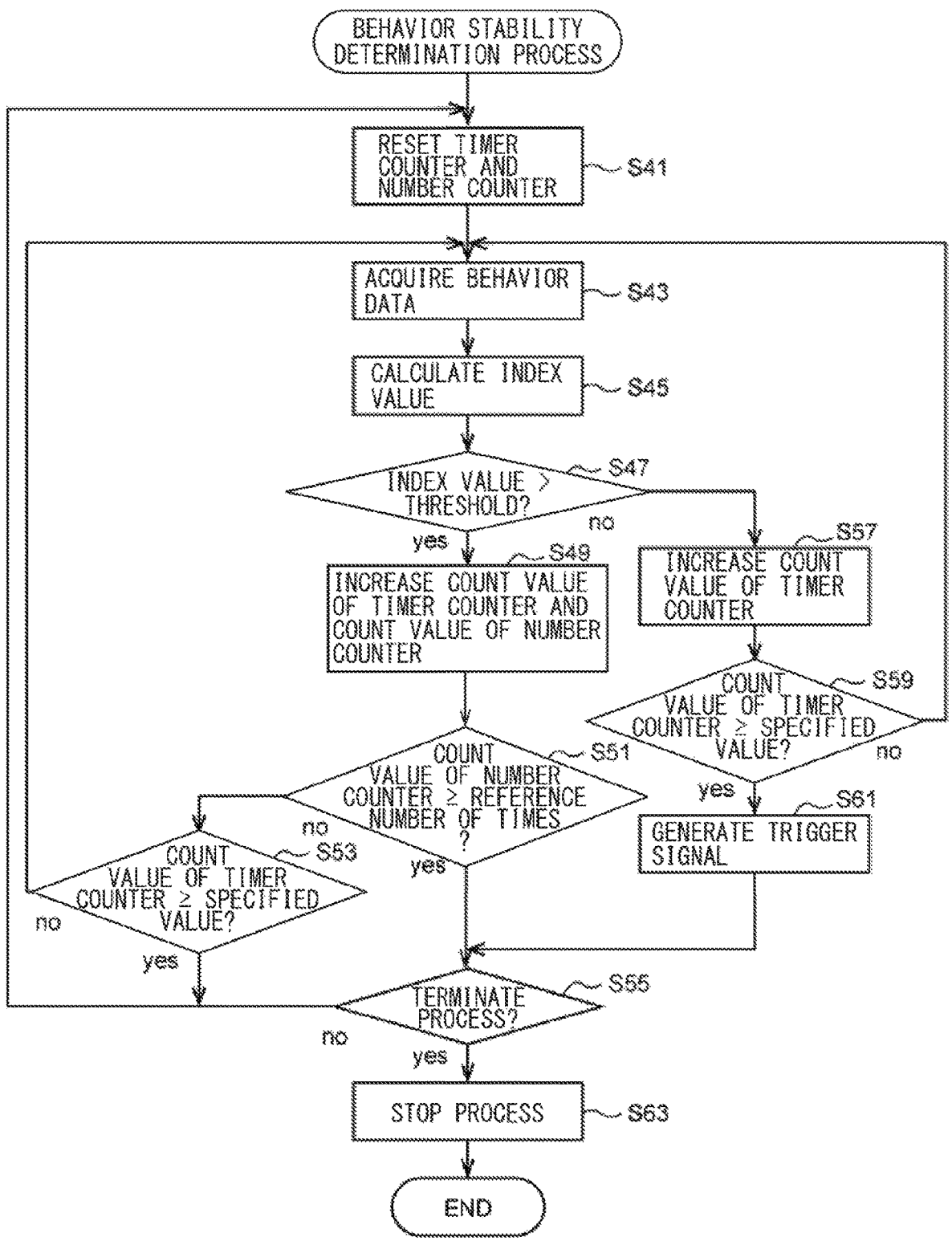
FIG. 11 is a flowchart of a behavior stability determination process according to one example embodiment.

Thereafter, the behavior stability determination unit 65 of the processor 53 may execute a process of determining the behavior stability of the vehicle (step S17). FIG. 11 is a flowchart illustrating a routine of the behavior stability determination process. First, the behavior stability determination unit 65 may reset a timer counter CT that measures a predetermined time period and a number counter C that counts the number of times the behavior of the vehicle has become unstable (step S41).

Thereafter, the acquisition unit 61 may acquire data indicating the behavior of the vehicle transmitted from the vehicle behavior measurement device 11 (step S43). In the example embodiment, the acquisition unit 61 may acquire respective pieces of data of the vehicle speed, the longitudinal acceleration, the lateral acceleration, the vertical acceleration, the angular velocity of the roll angle, the angular velocity of the pitch angle, and the angular velocity of the yaw angle.

Thereafter, the data processing unit 63 may execute the smoothing process, the absolute value conversion process, and the differential process with respect to each of the acquired pieces of data, and may calculate the index value indicating the magnitude of the behavior of the vehicle (step S45). At this time, the data processing unit 63 may execute data processing only for the number and the kind of pieces of data that have been set in the condition setting process of step S13, and calculate the index value. Alternatively, the data processing unit 63 may execute data processing for all pieces of data indicating the magnitude of the behavior of the vehicle, and calculate the index value by using only the number and the kind of pieces of data that have been set in the condition setting process of step S13. Further, in the example embodiment, the data processing unit 63 may replace the pieces of data to be used with values of a single index (e.g., values between 0 and 100), and set an average value of the values of all pieces of data to be used as the index value.

Thereafter, the behavior stability determination unit 65 may determine whether the determined index value exceeds the threshold thre_A (step S47). If the index value exceeds the threshold thre_A (S47/yes), the behavior stability determination unit 65 may increase, or may add 1 (one) to, respective count values of the timer counter CT and the number counter C (step S49). Thereafter, the behavior stability determination unit 65 may determine whether the count value of the number counter C has reached the reference number of times C0 (step S51). If the count value of the number counter C has not reached the reference number of times C0 (S51/no), the behavior stability determination unit 65 may determine whether the count value of the timer counter CT has reached a specified value (step S53). The specified value may be used for determining a predetermined time period. The specified value may be set to a value corresponding to an appropriate time within a range from 2 seconds to 10 seconds, for example. However, the predetermined time period may not be limited to the range from 2 seconds to 10 seconds.

If the count value of the timer counter CT has not reached the specified value (S53/no), the process may return to step S43 and the processor 53 may continue the behavior stability determination process. If the count value of the timer counter CT has reached the specified value (S53/yes), the process may return to step S41, and the processor 53 may reset the timer counter CT and the number counter C and may continue the behavior stability determination process.

In step S51, if the count value of the number counter C has reached the reference number of times C0 (S51/yes), the behavior stability determination unit 65 may determine whether to terminate the auditory stimulus outputting process (step S55). For example, if the condition under which the auditory stimulus outputting process is determined to be started in step S11 is no longer established, the behavior stability determination unit 65 may determine to terminate the auditory stimulus outputting process. If the auditory stimulus outputting process is determined to be terminated (S55/yes), the behavior stability determination unit 65 may stop the behavior stability determination process, and may terminate the routine (step S63).

If the auditory stimulus outputting process is not determined to be terminated (S55/no), the vehicle may be determined as being in a state where the behavior stability is low before the predetermined time period passes. The predetermined time period may be a time period in which the count value of the timer counter CT reaches the specified value. Thus, the process may return to step S41, and the processor 53 may reset both the timer counter CT and the number counter C and may continue the behavior stability determination process.

In step S47, if the index value is less than or equal to the threshold thre_A (S47/no), the behavior stability determination unit 65 may increase the count value of the timer counter CT (step S57). Thereafter, the behavior stability determination unit 65 may determine whether the count value of the timer counter CT has reached the specified value (step S59). The specified value may be used for determining whether the predetermined time period has passed.

If the count value of the timer counter CT has not reached the specified value (S59/no), the behavior stability of the vehicle may not be in a low state, but the predetermined time period may have not passed yet. Thus, the process may return to step S43, and the processor 53 may continue the behavior stability determination process. If the count value of the timer counter CT has reached the specified value (S59/yes), the behavior stability determination unit 65 may generate a trigger signal for varying the auditory stimulus (step S61).

Thereafter, the behavior stability determination unit 65 may determine whether to terminate the auditory stimulus outputting process (step S55). If the auditory stimulus outputting process is determined to be terminated (S55/yes), the behavior stability determination unit 65 may stop the behavior stability determination process, and may terminate the routine (step S63). If the auditory stimulus outputting process is not determined to be terminated (S55/no), the vehicle may be in a state of having been traveled for a predetermined time period in a state in which the behavior stability is high. Thus, the process may return to step S41, and the processor 53 may reset both the timer counter CT and the number counter C and may continue the behavior stability determination process.

By repeating steps S41 to S63, the behavior stability determination unit 65 may determine whether the vehicle has traveled for a predetermined time period in a state in which the behavior stability is high, and may also generate the trigger signal if the vehicle is determined to have traveled for the predetermined time period in the state in which the behavior stability is high. Thus, the behavior stability determination unit 65 is able to provide a trigger to vary the auditory stimulus to the output control unit 67 if the vehicle has traveled for the predetermined time period in the state in which the behavior stability is high.

Figure 12:
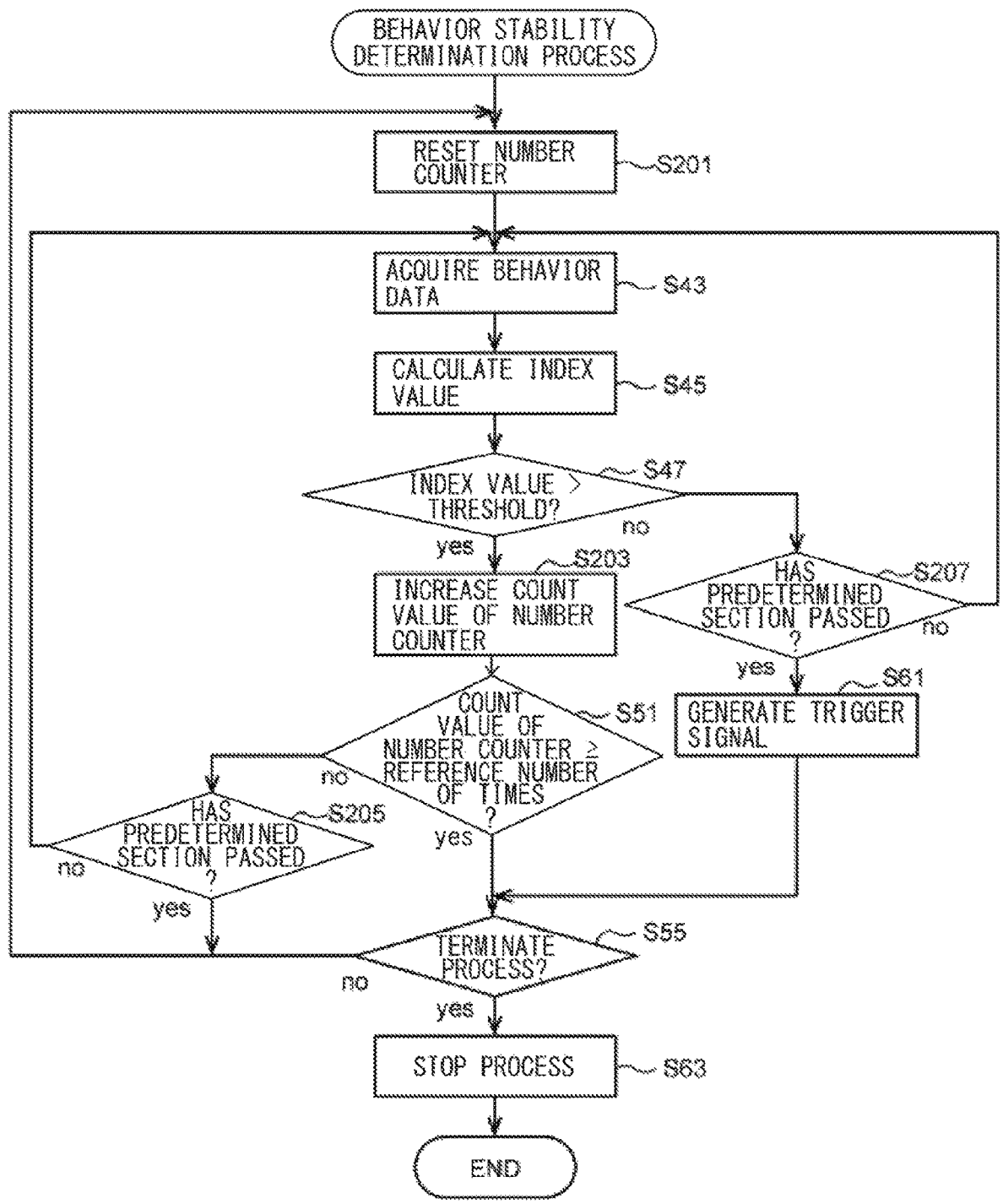
FIG. 12 is a flowchart illustrating another example of the behavior stability determination process according to one example embodiment.

FIG. 12 illustrates an example of a flowchart of a case of varying the auditory stimulus every time the vehicle travels the predetermined section in the state in which the behavior stability is high, instead of varying the auditory stimulus every time the vehicle travels the predetermined time period in the state in which the behavior stability is high. As described above, the predetermined section may be a section divided for each traveling distance or a section divided for each intersection where a traffic light is installed, and may be set by an appropriate reference.

In the case of using the predetermined section instead of the predetermined time period, step S57 in the flowchart of FIG. 11 may be omitted, as the time measurement process performed by the timer counter CT is unnecessary, and steps S41 and S49 may respectively be replaced with steps S201 and S203 in the flowchart of FIG. 12. In addition, steps S53 and S57 in the flowchart of FIG. 11 may respectively be replaced with steps S205 and S207 in the flowchart of FIG. 12. In steps S205 and S207, whether the vehicle has passed the predetermined section may be determined.

Figure 13:
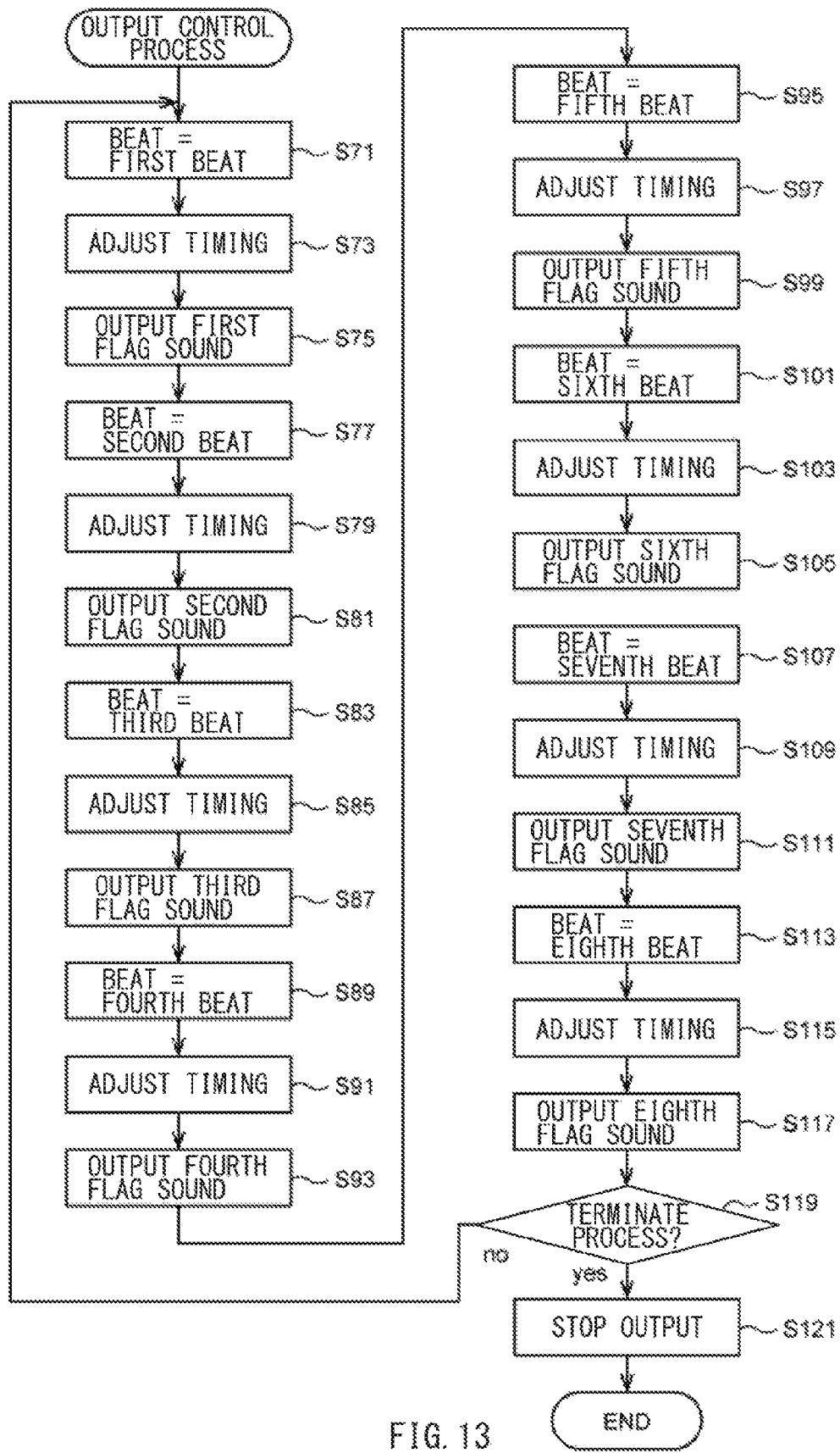
FIG. 13 is a flowchart illustrating a basic process of outputting an auditory stimulus according to one example embodiment.

Returning to FIG. 9, while the process of determining the behavior stability of the vehicle is being executed, the output control unit 67 of the processor 53 may execute a process of varying the auditory stimulus to be outputted (step S19). Here, a process of outputting the auditory stimulus while varying the auditory stimulus by the output control unit 67 will be described in detail. Referring to FIG. 13, a basic process of outputting the auditory stimulus in accordance with a rhythm pattern illustrated in FIG. 6 will be described. Thereafter, referring to FIG. 14, a process of varying the auditory stimulus will be described.

FIG. 13 is a flowchart illustrating the basic process of outputting the auditory stimulus in accordance with the rhythm pattern illustrated in FIG. 6.

After start of the output control process, the output control unit 67 may first set a beat on which a sound is to be outputted to a first beat (step S71). Thereafter, the output control unit 67 may adjust a timing of outputting the sound set to the first flag on the first beat (step S73). Thereafter, the output control unit 67 may cause the sound set to the first flag to be outputted when the adjusted output timing arrives (step S75). Thereafter, until the auditory stimulus outputting process terminates, the outputting of the sounds on the first to eighth beats may be repeated while the setting of the beat, the adjustment of the outputting timing, and the outputting of the sound are executed for each beat (steps S71 to S119). If the output control unit 67 determines to terminate the auditory stimulus outputting process (S119/yes), the output control unit 67 may stop the output control process, and may terminate the routine (step S121).

The adjustment of the timing at which the sound is outputted may be performed to set an interval at which the eighth-note sounds are outputted to a certain interval. For example, in a case where a rate of processing such as switching of beat settings performed by the processor is high and a time lag is ignorable in terms of human sense, the output control unit 67 may wait for the outputting of the sound for a period of time corresponding to the beat interval. In contrast, in a case where the rate of processing performed by the processor is not constant, the output control unit 67 may wait for the outputting of the sound in such a manner that a time that has passed from a time point at which the sound is outputted on the last beat is equal to the time corresponding to the beat interval. For example, assuming that the beat interval is represented by dT, a time point T(n−1) at which the sound is outputted on the last beat may be stored, and a time (dT−(Tnow−T(n−1))) obtained by subtracting, from the beat interval dT, a time that has passed (Tnow−T(n−1)) from the time point T(n−1) to a time point Tnow at which a waiting time is to be set may be set as the waiting time. As a result, the interval at which the sounds are outputted on the respective beats becomes constant.

Figure 14:
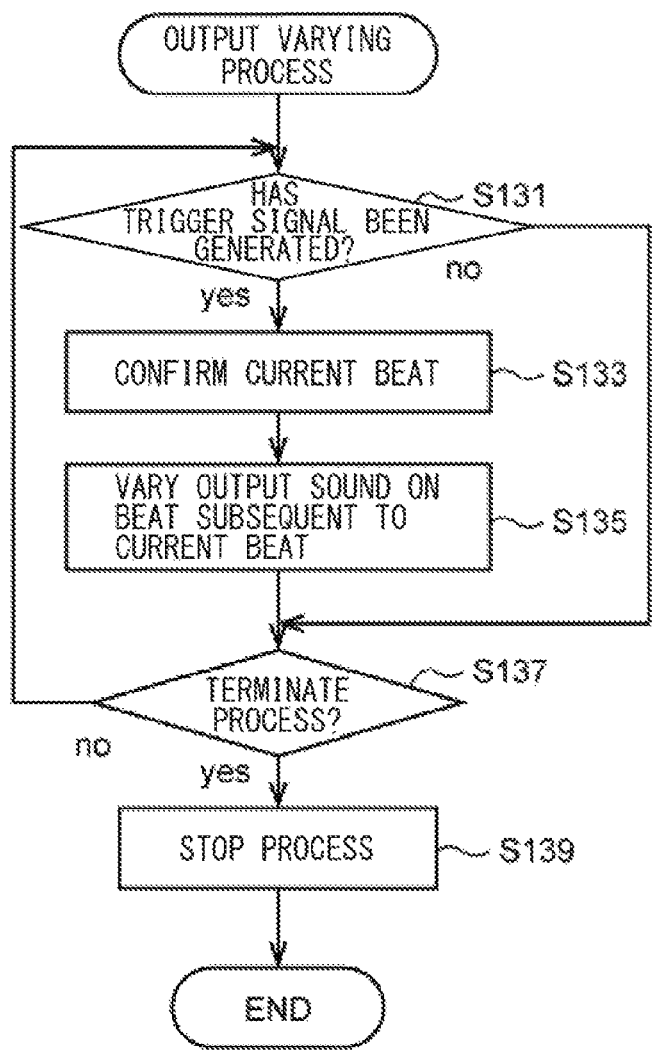
FIG. 14 is a flowchart illustrating an example of an output varying process according to one example embodiment.

FIG. 14 is a flowchart illustrating a process of varying the auditory stimulus, i.e., an output varying process, which may be performed in a case where the trigger signal is generated by the behavior stability determination unit 65.

The output control unit 67 may determine whether the trigger signal has been generated by the behavior stability determination unit 65 (step S131). If no trigger signal has been generated (S131/no), the output control unit 67 may determine whether to terminate the auditory stimulus outputting process (step S137), and may repeat the determination of step S131 while the auditory stimulus outputting process is not determined to be terminated (S137/no).

If the trigger signal has been generated (S131/yes), the output control unit 67 may confirm a setting of the current beat (step S133). The output control unit 67 may vary an output sound on the beat subsequent to the current beat (step S135). A way of varying the output sound may be determined, for example, in accordance with a program that is set in advance. For example, the sound sources SS5 to SS8 set in the varied pattern may be varied in the order of sound source numbers, or may be varied randomly. At this time, an output volume level of each of the sound sources SS5 to SS8 may be switched to 0 or 1 to perform switching between the outputting or the stopping, or the output volume level may be switched between 0 and 1 to vary the volume. In this case, the output volume level may be gradually increased or decreased at equal intervals, may be gradually increased or decreased at unequal intervals, or may be randomly varied. In addition, the output control unit 67 may further increase kinds of sound sources (from SS9 onward) and may vary the number of bars to be repeated.

Thereafter, the output control unit 67 may determine whether to terminate the auditory stimulus outputting process (step S137). If the auditory stimulus outputting process is determined to be terminated (S137/yes), the output control unit 67 may stop the output varying process and may stop the routine (step S139). If the auditory stimulus outputting process is not determined to be terminated (S137/no), the process may return to step S131 and the output control unit 67 may continue the output varying process. Thus, the output control unit 67 may vary the auditory stimulus each time the trigger signal is generated by the behavior stability determination unit 65, while causing the auditory stimulus to be outputted in a predetermined rhythm pattern.

Returning to FIG. 9, the processor 53 may determine whether to terminate the auditory stimulus outputting process (step S21) while executing the behavior stability determination process (step S17) by the behavior stability determination unit 65 and the output varying process (step S19) by the output control unit 67. For example, if the condition for which the auditory stimulus outputting process is determined to be started in step S11 is no longer established, the processor 53 may determine to terminate the auditory stimulus outputting process. If the auditory stimulus outputting process is not determined to be terminated (S21/no), the process may return to step S17 and the processor 53 may repeatedly execute the behavior stability determination process and the output varying process. If the auditory stimulus outputting process is determined to be terminated (S21/yes), the processor 53 may stop the auditory stimulus outputting process, and may terminate the routine (step S23).

1-4. Example Effects of Example Embodiment

As described above, the driving assistance apparatus 1 according to the example embodiment may acquire the information indicating the behavior of the vehicle while the vehicle is traveling, and may output the auditory stimulus while varying the auditory stimulus every time the vehicle travels the predetermined time period in the state in which the behavior stability obtained from the acquired information is high. This may cause the driver during driving to recognize the behavior stability of the vehicle in real time. Further, the auditory stimulus may not include a display or text information of a voice. This makes it possible to cause the driver to intuitively recognize the behavior stability by means of the auditory stimulus, thereby suppressing the decrease in the attention of the driver. Still further, the auditory stimulus may vary every time the vehicle travels the predetermined time period in the state in which the behavior stability is high. This makes it possible to give the driver no impression of denying the driving of the driver, thereby preventing the effect of improving the driving skill of the driver from decreasing. In addition, the driver will receive stimulative variation while the behavior of the vehicle is stable, which makes it possible to provide the driver with motivation for performing a driving operation that allows the behavior of the vehicle to be more stable.

The driving assistance apparatus 1 according to the example embodiment may compare the index value obtained on the basis of the measurement data acquired while the vehicle is traveling with the predetermined threshold, and may set the number of times the index value has exceeded the predetermined threshold as the information of the behavior stability. This avoids determining that the behavior stability of the vehicle has decreased when the index value has exceeded the threshold only once, and makes it possible to correctly evaluate the behavior stability of the vehicle during the driving operation performed by the driver.

The driving assistance apparatus 1 according to the example embodiment may set the threshold or the reference number of times on the basis of the information about the attribute related to the driving skill of the driver. In one example, the threshold may be decreased or the reference number of times may be decreased as the level of the driving skill of the driver increases, and the threshold may be increased or the reference number of times may be increased as the level of the driving skill of the driver decreases. This makes it possible to lead the driver whose driving skill is high to the driving operation state which increases the behavior stability of the vehicle, and to lead the driver whose driving skill is low to make the behavior stability be in an appropriate level depending on the driving skill of the driver.

The driving assistance apparatus 1 according to the example embodiment may stop the auditory stimulus outputting process in a traveling environment in which the behavior stability of the vehicle is decreased. This may avoid presenting an inaccurate evaluation to the driver. This may also prevent the driving operation of the driver from being led to an inappropriate operation state on the basis of the inaccurate evaluation.

The driving assistance apparatus 1 according to the example embodiment may output the auditory stimulus by combining the sound of the basic pattern whose output pattern does not vary and the sound of the varied pattern whose output pattern varies. This makes it possible to vary the auditory stimulus without giving the sense of discomfort or the uncomfortable feeling to the driver, and to cause the driver to recognize the behavior stability of the vehicle.

In the example embodiment, the drum sound including the eight sound sources SS1 to SS8 may be used as the auditory stimulus to be outputted; however, as described above, the auditory stimulus to be outputted may not be limited to the drum sound, and may be any sound. In this case, the output pattern of the auditory stimulus such as the volume, the rhythm, the tempo, or the order of outputting the sound sources may be appropriately varied every time the vehicle travels the predetermined time period or the predetermined section. This makes it possible to notify the driver during driving of the information related to the evaluation of the driving operation of the driver in such a manner that the information does not give the impression of denying the driving of the driver, and the decrease in attention of the driver is suppressible.

2. Second Example Embodiment

Next, a driving assistance apparatus according to a second example embodiment of the technology will be described.

The driving assistance apparatus described in the first example embodiment may determine the behavior stability of the vehicle by comparing the index value indicating the magnitude of the behavior of the vehicle with one threshold, and may vary the auditory stimulus (see FIGS. 4 and 5). In contrast, the driving assistance apparatus according to the second example embodiment may compare the index value indicating the magnitude of the behavior of the vehicle with multiple thresholds, and may vary the auditory stimulus in such a manner that with a decrease in a maximum value of the index value in each time period, a degree of varying the auditory stimulus increases.

The driving assistance apparatus according to the second example embodiment may be configured in a similar manner as the driving assistance apparatus 1 according to the first example embodiment except that the auditory stimulus outputting process is executed using multiple thresholds. Hereinafter, among processing operations of the driving assistance apparatus according to the example embodiment, processing operations that differ from the processing operations of the driving assistance apparatus 1 according to the first example embodiment will be described.

Figure 15:
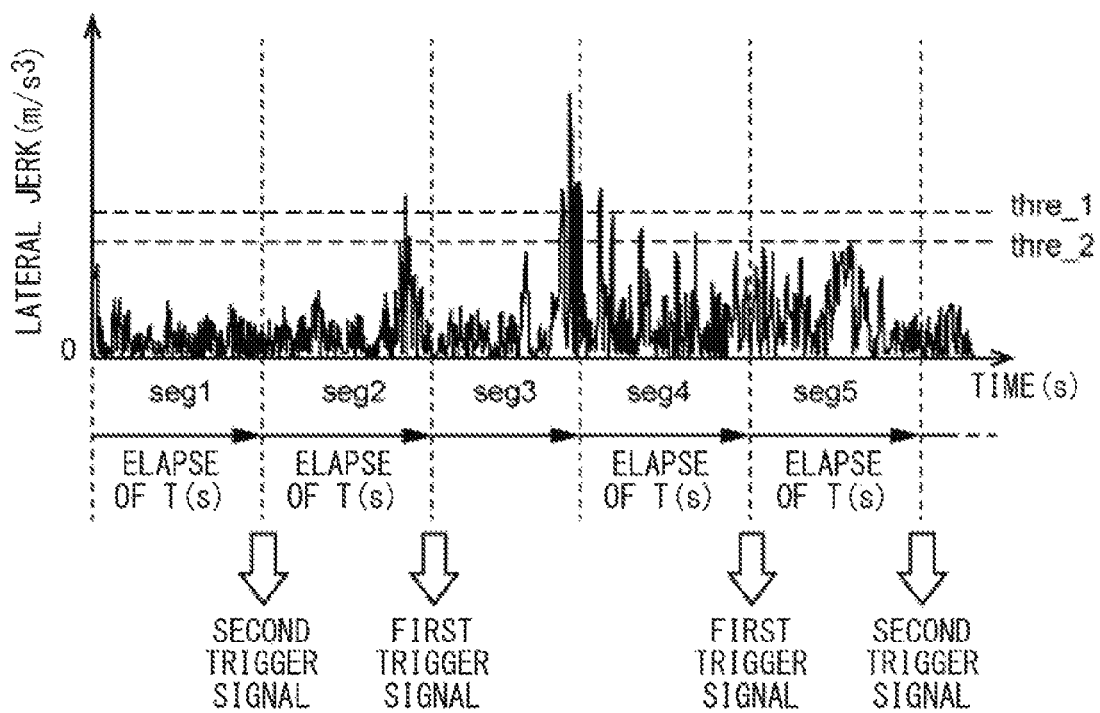
FIG. 15 is an explanatory diagram illustrating an example of a behavior stability determination process according to one example embodiment.

FIG. 15 is an explanatory diagram illustrating an example of determining the behavior stability of the vehicle using a first threshold thre_1 and a second threshold thre_2, which is less than the first threshold thre_1. Assuming that a value of the lateral jerk (index value) is the same as that of FIG. 4 and in a case where the first threshold thre_1 is set to the same value as that of the threshold thre_A in FIG. 4, the predetermined time period T may have passed without the number of times the index value has exceeded the first threshold thre_1 reaching four, in each of the first time period seg1, the second time period seg2, the fourth time period seg4, and the fifth time period seg5. The behavior stability determination unit 65 may thus generate the trigger signal when each time period has passed.

However, in each of the first time period seg1 and the fifth time period seg5, the predetermined time period T may have passed without the index value exceeding the second threshold thre_2. The behavior stability determination unit 65 may thus generate a second trigger signal when the first time period seg1 has passed and the second trigger signal when the fifth time period seg5 has passed. The second trigger signal may be a trigger signal indicating that a predetermined time period has passed without the index value exceeding the second threshold thre_2 which is relatively small in each time period. In the second time period seg2 and the fourth time period seg4, the predetermined time period T may have passed without the number of times the index value has exceeded the first threshold thre_1 reaching four; however, a record may be present indicating that the index value has exceeded the second threshold thre_2. The behavior stability determination unit 65 may thus generate a first trigger signal when the second time period seg2 has passed and the first trigger signal when the fourth time period seg4 has passed. The first trigger signal may be a trigger signal indicating that, although the behavior stability of the vehicle is not determined to be in a low state in each time period, the record is present indicating that the index value has exceeded a relatively low second threshold thre_2.

The output control unit 67 may vary the way of varying the auditory stimulus depending on whether the generated trigger signal is the first trigger signal or the second trigger signal. For example, the output control unit 67 may vary the way of varying the auditory stimulus depending on the difference between the trigger signals, in such a manner that the driver is able to recognize the degree of varying the auditory stimulus, such as the number of sound sources, a variation width of the volume, or a variation width of the pitch for varying the output pattern. For example, any embodiment of the technology may vary the auditory stimulus in a case where the behavior stability of the vehicle is high. Thus, the degree of varying the auditory stimulus based on the second trigger signal may be set to be larger than the degree of varying the auditory stimulus based on the first trigger signal. This allows the driver to recognize the driving operation state in more detail and intuitively.

The number of thresholds to be set may be three or more. In addition, a value of each of some or all of the multiple thresholds may be increased or decreased in accordance with the driving skill of the driver estimated on the basis of the information about the attribute of the driver according to the setting example illustrated in FIG. 8.

Figure 16:
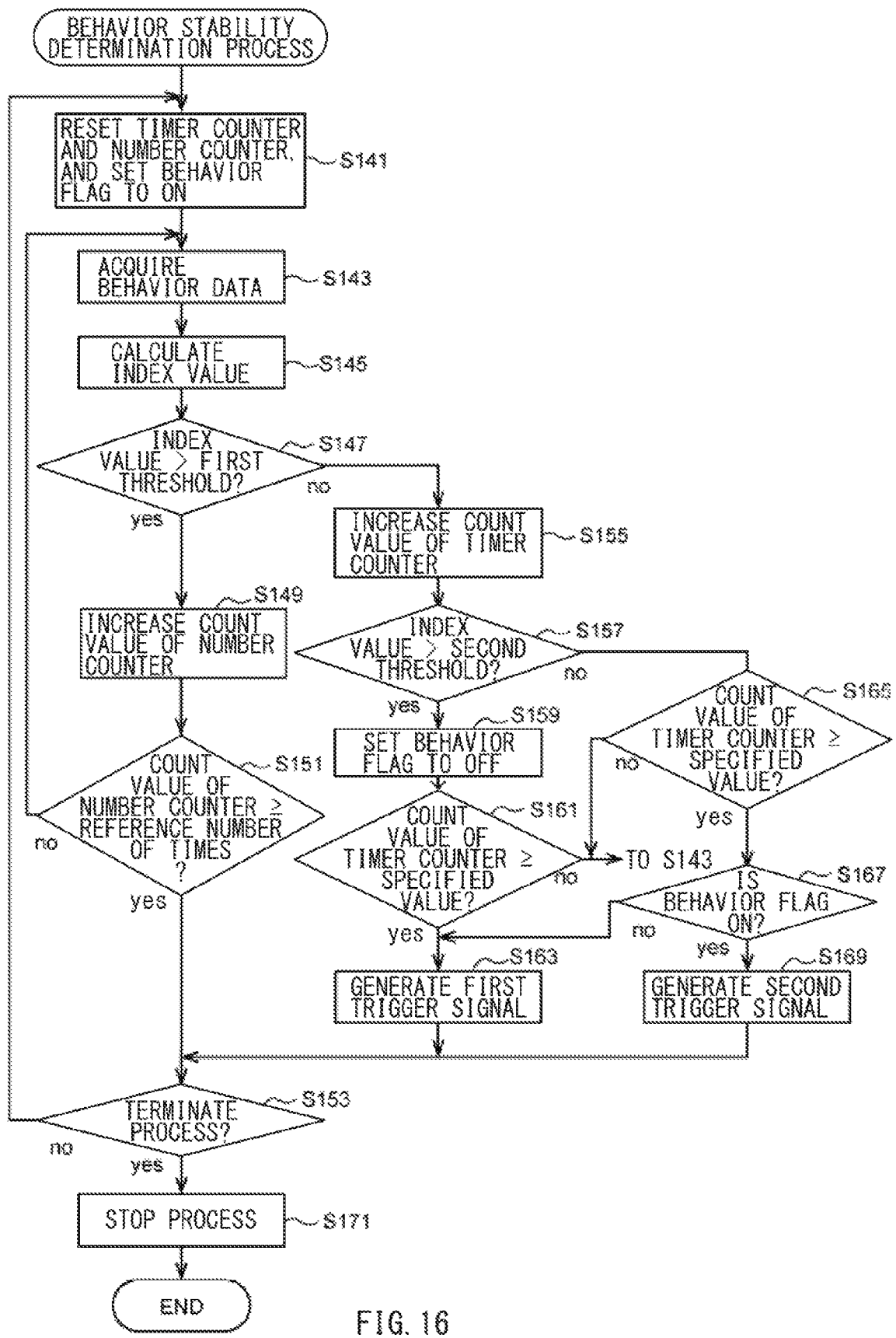
FIG. 16 is a flowchart of the behavior stability determination process according to one example embodiment.

FIG. 16 is a flowchart illustrating a routine of a behavior stability determination process using the first threshold thre_1 and the second threshold thre_2, and may indicate a process that may be replaced with the process of FIG. 11.

First, the behavior stability determination unit 65 may reset the timer counter CT that measures a predetermined time period and the number counter C that counts the number of times the behavior of the vehicle has become unstable, and may also set a behavior flag to ON (step S141). The behavior flag may indicate that the index value indicating the magnitude of the behavior is less than or equal to the second threshold thre_2.

Thereafter, as in the process of steps S43 to S45 of FIG. 11, the acquisition unit 61 may acquire data indicating the behavior of the vehicle transmitted from the vehicle behavior measurement device 11 (step S143), following which the data processing unit 63 may execute the smoothing process, the absolute value conversion process, and the differential process with respect to each of the acquired pieces of data, and may calculate the index value indicating the magnitude of the behavior of the vehicle (step S145).

Thereafter, the behavior stability determination unit 65 may determine whether the determined index value exceeds the first threshold thre_1 (step S147). If the index value exceeds the first threshold thre_1 (S147/yes), the behavior stability determination unit 65 may increase, or may add 1 (one) to, a count value of the number counter C (step S149). Thereafter, the behavior stability determination unit 65 may determine whether the count value of the number counter C has reached the reference number of times C0 (step S151). If the count value of the number counter C has not reached the reference number of times C0 (S151/no), the process may return to step S143, and the processor 53 may continue the behavior stability determination process.

If the count value of the number counter C has reached the reference number of times C0 (S151/yes), the behavior stability determination unit 65 may determine whether to terminate the auditory stimulus outputting process (step S153). For example, if the condition for which the auditory stimulus outputting process is determined to be started in step S11 is no longer established, the behavior stability determination unit 65 may determine to terminate the auditory stimulus outputting process. If the auditory stimulus outputting process is determined to be terminated (S153/yes), the behavior stability determination unit 65 may stop the behavior stability determination process, and may terminate the routine (step S171).

If the auditory stimulus outputting process is not determined to be terminated (S153/no), the vehicle may be determined as being in a state where the behavior stability is low before the predetermined time period passes. The predetermined time period may be a time period in which the count value of the timer counter CT reaches the specified value. Thus, the process may return to step S141, and the processor 53 may reset both the timer counter CT and the number counter C, may set the behavior flag to ON, and may continue the behavior stability determination process.

In step S147, if the index value is less than or equal to the first threshold thre_1 (S147/no), the behavior stability determination unit 65 may increase the count value of the timer counter CT (step S155). Thereafter, the behavior stability determination unit 65 may determine whether the determined index value exceeds the second threshold thre_2 (step S157). If the index value exceeds the second threshold thre_2 (S157/yes), the behavior stability determination unit 65 may set the behavior flag to OFF (step S159). Thereafter, the behavior stability determination unit 65 may determine whether the count value of the timer counter CT has reached the specified value (step S161). The specified value may be used for determining whether the predetermined time period has passed. The specified value may be set to a value corresponding to an appropriate time within a range from 2 seconds to 10 seconds, for example. However, the predetermined time period may not be limited to the range from 2 seconds to 10 seconds.

If the count value of the timer counter CT has not reached the specified value (S161/no), the behavior stability of the vehicle may not be in a low state, but the predetermined time period may have not passed yet. Thus, the process may return to step S143, and the processor 53 may continue the behavior stability determination process. If the count value of the timer counter CT has reached the specified value (S161/yes), the behavior stability determination unit 65 may generate the first trigger signal for varying the auditory stimulus (step S163).

Thereafter, the behavior stability determination unit 65 may determine whether to terminate the auditory stimulus outputting process (step S153). If the auditory stimulus outputting process is determined to be terminated (S153/yes), the behavior stability determination unit 65 may stop the behavior stability determination process, and may terminate the routine (step S171). If the auditory stimulus outputting process is not determined to be terminated (S153/no), the vehicle may be in a state of having been traveled for a predetermined time period in a state in which the behavior stability is high. Thus, the process may return to step S141, and the processor 53 may reset both the timer counter CT and the number counter C, may set the behavior flag to ON, and may continue the behavior stability determination process.

In step S157, if the index value is less than or equal to the second threshold thre_2 (S157/no), the behavior stability determination unit 65 may determine whether the count value of the timer counter CT has reached the specified value, while keeping the setting of the behavior flag in the ON state or in the OFF state (step S165). The specified value may be used for determining whether the predetermined time period has passed.

If the count value of the timer counter CT has not reached the specified value (S165/no), the behavior stability of the vehicle may not be in a low state, but the predetermined time period may have not passed yet. Thus, the process may return to step S143, and the processor 53 may continue the behavior stability determination process. If the count value of the timer counter CT has reached the specified value (S165/yes), the behavior stability determination unit 65 may determine whether a current setting of the behavior flag is ON (step S167).

If the setting of the behavior flag is OFF (S167/no), the predetermined time period T may have passed without the number of times the index value has exceeded the first threshold thre_1 reaching the reference number of times; however, a record may be present indicating that the index value has exceeded the second threshold thre_2. The behavior stability determination unit 65 may thus generate the first trigger signal (step S163). If the setting of the behavior flag is ON (S167/yes), the predetermined time period T may have passed without the index value exceeding the second threshold thre_2 and without the number of times the index value has exceeded the first threshold thre_1 reaching the reference number of times. The behavior stability determination unit 65 may thus generate the second trigger signal (step S169).

Thereafter, the behavior stability determination unit 65 may determine whether to terminate the auditory stimulus outputting process (step S153). If the auditory stimulus outputting process is determined to be terminated (S153/yes), the behavior stability determination unit 65 may stop the behavior stability determination process, and may terminate the routine (step S169). If the auditory stimulus outputting process is not determined to be terminated (S153/no), the vehicle may be in a state of having been traveled for a predetermined time period in a state in which the behavior stability is high. Thus, the process may return to step S141, and the processor 53 may reset both the timer counter CT and the number counter C, may set the behavior flag to ON, and may continue the behavior stability determination process.

By repeating steps S141 to S171, the behavior stability determination unit 65 may determine whether the vehicle has traveled for a predetermined time period in a state in which the behavior stability is high, and may also generate the first trigger signal or the second trigger signal in accordance with the level of behavior stability if the vehicle is determined to have traveled for the predetermined time period in the state in which the behavior stability is high. Thus, the behavior stability determination unit 65 is able to provide, in accordance with the level of behavior stability, a trigger to vary the auditory stimulus to the output control unit 67 if the vehicle has traveled for the predetermined time period in the state in which the behavior stability is high.

Figure 17:
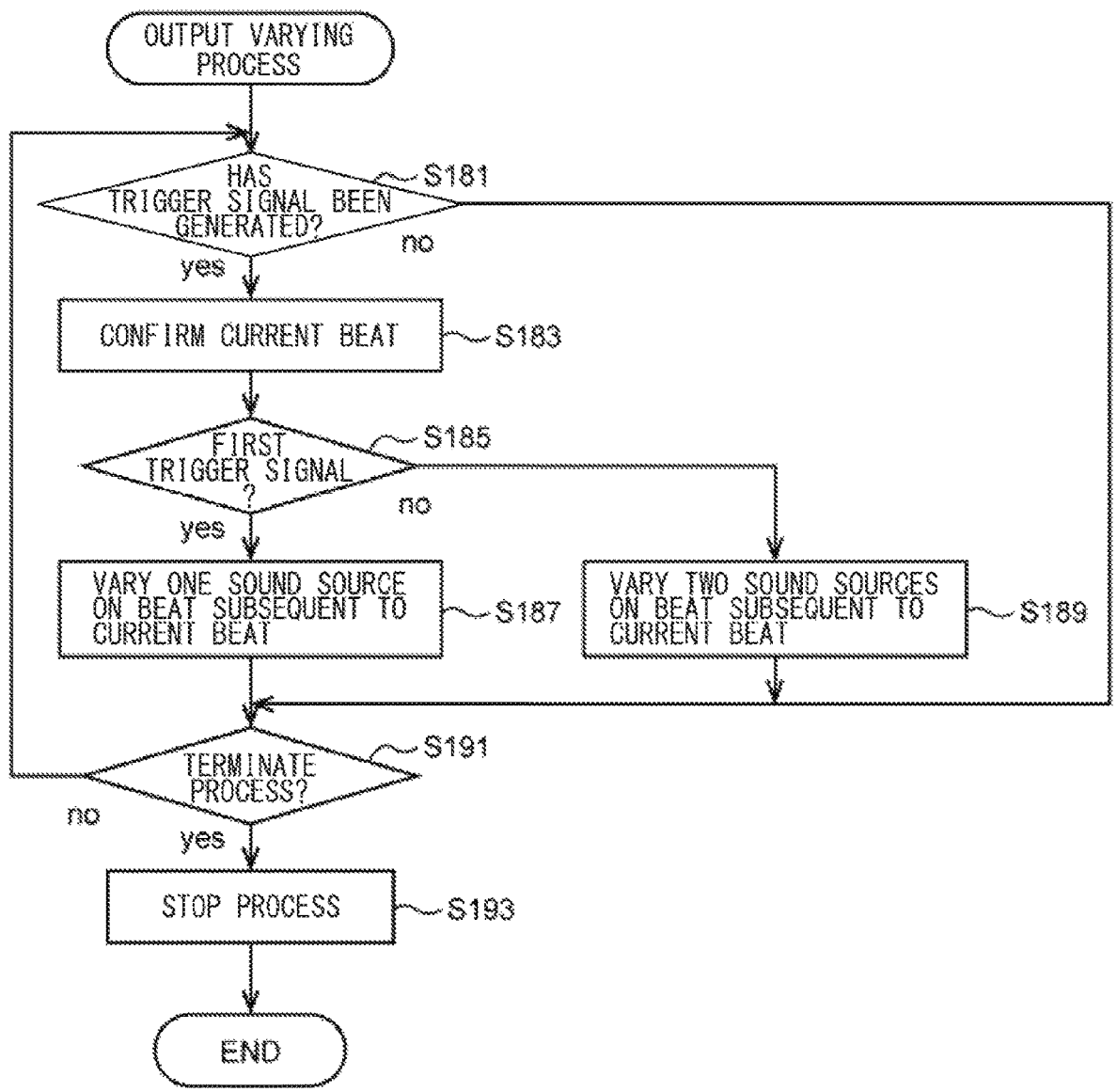
FIG. 17 is a flowchart illustrating an example of an output varying process according to one example embodiment.

FIG. 17 is a flowchart illustrating an output varying process in a case where the first trigger signal or the second trigger signal is generated by the behavior stability determination unit 65, and may indicate a process that may be replaced with the process of FIG. 14.

The output control unit 67 may determine whether the trigger signal has been generated by the behavior stability determination unit 65 (step S181). If no trigger signal has been generated (S181/no), the output control unit 67 may determine whether to terminate the auditory stimulus outputting process (step S191), and may repeat the determination of step S181 while the auditory stimulus outputting process is not determined to be terminated (S191/no).

If the trigger signal has been generated (S181/yes), the output control unit 67 may confirm a setting of the current beat (step S183). Thereafter, the output control unit 67 may determine whether the generated trigger signal is the first trigger signal (step S185). If the trigger signal is the first trigger signal (S185/yes), the output control unit 67 may vary one sound source out of output sounds on the beat subsequent to the current beat (step S187). If the trigger signal is not the first trigger signal (S185/no), in other words, if the trigger signal is the second trigger signal, the output control unit 67 may vary two sound sources out of the output sounds on the beat subsequent to the current beat (step S189).

A way of varying the output sound may be determined, for example, in accordance with a program that is set in advance. For example, the sound sources SS5 to SS8 set in the varied pattern may be varied in the order of sound source numbers, or may be varied randomly. At this time, an output volume level of each of the sound sources SS5 to SS8 may be switched to 0 or 1 to perform switching between the outputting or the stopping, and the output volume level may be switched between 0 and 1 to vary the volume. In this case, the output volume level may be gradually increased or decreased at equal intervals, may be gradually increased or decreased at unequal intervals, or may be randomly varied.

Thereafter, the output control unit 67 may determine whether to terminate the auditory stimulus outputting process (step S191). If the auditory stimulus outputting process is determined to be terminated (S191/yes), the output control unit 67 may stop the output varying process and may stop the routine (step S193). If the auditory stimulus outputting process is not determined to be terminated (S191/no), the process may return to step S181 and the output control unit 67 may continue the output varying process. Thus, the output control unit 67 may vary the auditory stimulus in accordance with the first trigger signal or the second trigger signal generated by the behavior stability determination unit 65, while causing the auditory stimulus to be outputted in a predetermined rhythm pattern.

As described above, the driving assistance apparatus 1 according to the second example embodiment may determine a level of the behavior stability using multiple thresholds which are used for determining the behavior stability of the vehicle, and may generate a trigger signal depending on the level of the behavior stability, thereby varying the auditory stimulus differently in accordance with the level of the behavior stability. Accordingly, in addition to the effects of the driving assistance apparatus 1 according to the example embodiment described above, the driver is able obtain the effect that the driver is able to recognize the driving operation state in more detail and intuitively. This makes it possible to provide the driver with motivation for attempting to increase the behavior stability of the vehicle, and to improve the driving skill of the driver.

The driving assistance apparatus 1 according to the second example embodiment may also be configured to vary the auditory stimulus every time the vehicle travels the predetermined section in the state in which the behavior stability is high, instead of varying the auditory stimulus every time the vehicle travels the predetermined time period in the state in which the behavior stability is high.

3. Third Example Embodiment

Next, a driving assistance apparatus according to a third example embodiment of the technology will be described.

The driving assistance apparatus 1 according to the first example embodiment and the second example embodiment may output the auditory stimulus while varying the auditory stimulus every time the vehicle travels the predetermined time period or the predetermined section in the state in which the behavior stability is high. Considering a case where the driver drives the vehicle for a long period of time, the driver can get accustomed to the varied pattern of the auditory stimulus and can become used to the auditory stimulus. In one example, in a case where the auditory stimulus is outputted in a combination of the sound of the basic pattern whose auditory stimulus does not vary and the sound of the varied pattern whose auditory stimulus varies, it may be conceivable that the driver may easily become used to the auditory stimulus due to the fact that the basic pattern does not vary.

Accordingly, the driving assistance apparatus 1 according to the third example embodiment may be configured to vary the kind of the auditory stimulus and the sound of the basic pattern at a time point when an area in which the vehicle is traveling has changed, at a time point when a predetermined time period (hereinafter, also referred to as "basic output varying time period") or a predetermined section (hereinafter, also referred to as "basic output varying section") set for a longer time or a longer distance has passed, or at a time point when a user desires a change.

For example, for a case of the drum sound rhythm illustrated in FIGS. 6 and 7, the output control unit 67 may vary the sound of the basic pattern, not the sound of the varied pattern, every time the basic output varying time period or the basic output varying section has passed. The sound of the varied pattern may be varied every time the vehicle travels the predetermined time period or the predetermined section in the state in which the behavior stability is high. In addition to the case of using the drum sound rhythm, the output control unit 67 may change the kind of auditory stimulus to a different kind of auditory stimulus every time the basic output varying time period or the basic output varying section has passed. For example, the output control unit 67 may change the output of the auditory stimulus of the drum sound rhythm to the output of another kind of auditory stimulus such as a coin winning sound, every time the basic output varying time period or the basic output varying section has passed.

Figure 18:
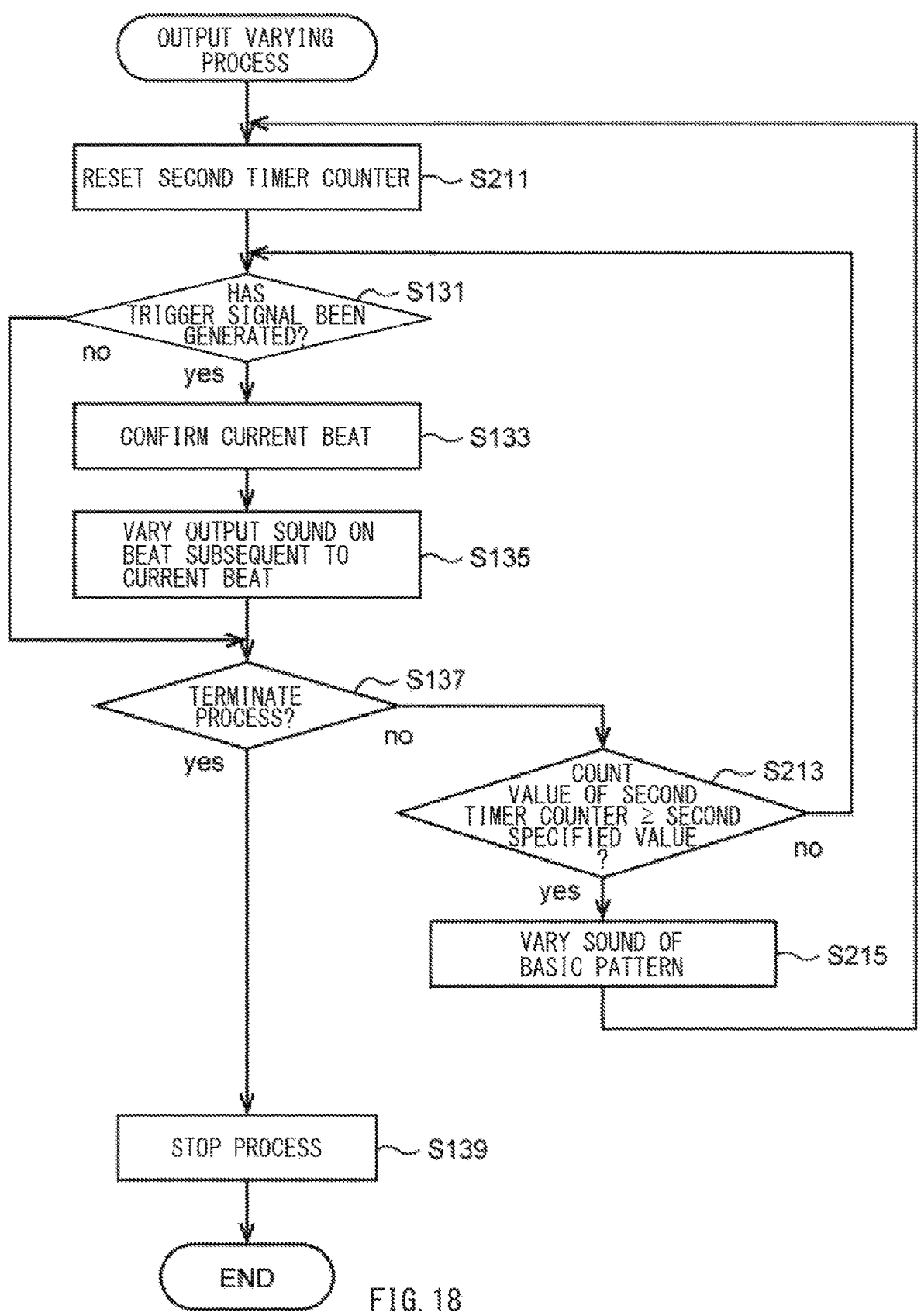
FIG. 18 is a flowchart illustrating an example of an output varying process according to one example embodiment.

FIG. 18 is a flowchart illustrating an example of the output varying process performed by the driving assistance apparatus 1 according to the example embodiment, which may be replaced with the output varying process illustrated in FIG. 14. In the example of the process illustrated in FIG. 18, the process of varying the sound of the basic pattern of the drum sound rhythm illustrated in FIGS. 6 and 7 may be executed every time the basic output varying time period has passed.

As illustrated in FIG. 18, steps S211, S213, and S215 may be added to the output varying process illustrated in FIG. 14 to obtain the output varying process performed by the driving assistance apparatus 1 according to the example embodiment. Steps S211, S213, and S215 may be steps for determining whether the predetermined time period has passed and for varying the sound of the basic pattern. In one example, the output control unit 67 may reset a second timer counter CT2 that measures the basic output varying time period after start of the auditory stimulus outputting process (step S211). The second timer counter CT2 may start counting after the resetting. The timer counter CT that measures the predetermined time period that may be used for determining whether the vehicle has traveled for the predetermined time period in the state in which the behavior stability is high may be regarded as a first timer counter, and the timer counter for measuring the basic output varying time period is referred to as second timer counter CT2.

Thereafter, the output control unit 67 may execute the process of steps S131 to S137 in accordance with a procedure described with reference to the flowchart of FIG. 14. In step S137, if the auditory stimulus outputting process is not determined to be terminated (S137/no), the output control unit 67 may determine whether the count value of the second timer counter CT2 has reached a second specified value that is set in advance to determine whether the basic output varying time period has passed (step S213). The second specified value may be, for example, 30 minutes or longer, but may not be particularly limited.

If the count value of the second timer counter CT2 has not reached the second specified value (S213/no), the process may return to step S131 and the output control unit 67 may continue the output varying process. If the count value of the second timer counter CT2 reaches the second specified value (S213/yes), the output control unit 67 may vary the sound of the basic pattern including the sound sources SS1 to SS4 (step S215). A way of varying the sound of the basic pattern may be determined, for example, in accordance with a program that is set in advance. For example, the sound of the basic pattern may be changed to a sound of a pattern whose rhythm or tempo is different from the rhythm or the tempo of the basic pattern. Thereafter, the process may return to step S211, and the output control unit 67 may reset the count value of the second timer counter CT2 and may continue the output varying process.

In a case where whether the basic output varying section has passed is determined instead of determining whether the basic output varying time period has passed, the driving assistance apparatus 1 may be able to vary the sound of the basic pattern of auditory stimulus outputs when determining that the basic output varying section has passed on the basis of, for example, vehicle position information detected by a position finding system such as GPS and map data of a navigation system.

As described above, the driving assistance apparatus 1 according to the third example embodiment may not only vary the auditory stimulus every time the vehicle travels a relatively short predetermined time period or a relatively short predetermined section in the state in which the behavior stability is high, but may also vary the kind of the auditory stimulus or the sound of the basic pattern, which is not varied with the passing of the predetermined time period or the predetermined section, every time the basic output varying time period which is set to a relatively long period of time or the basic output varying section which is set to a relatively long distance has passed. As a result, even in a case where the driver drives the vehicle for a long period of time, the driver is prevented from becoming too used to the auditory stimulus, which makes it possible for the driver to keep the motivation for improving the driving skill.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

For example, a traveling section for evaluating the behavior stability in the longitudinal direction of the vehicle and/or the behavior stability in the lateral direction of the vehicle may be set in advance, and the driving assistance apparatus 1 may calculate only desired data selected from the longitudinal acceleration, the longitudinal jerk, the angular velocity of the pitch angle, the angular acceleration of the pitch angle, the lateral acceleration, the lateral jerk, the angular velocity of the yaw angle, and the angular acceleration of the yaw angle, from the time of starting the traveling to the time of completing the traveling of the section, thereby evaluating the desired behavior stability. This makes it possible to reduce the workload on the calculation performed by the information processing device 50.

In the above example embodiments, the vehicle behavior measurement device 11 of the driving assistance apparatus 1 may be a kind of sensor provided in the vehicle, the output device 21 may be the speaker system provided in the vehicle, and the information processing device 50 may be communicably coupled to the vehicle behavior measurement device 11 and to the output device 21, each via the communication bus such as CAN, but the technology may not be limited to these examples. For example, the driving assistance apparatus 1 may be configured as a portable terminal device such as a smart phone. The driving assistance apparatus 1 being configured as a portable terminal device makes it possible to use the auditory stimulus outputting process regardless of the vehicle that the driver drives, to increase chances of improving the driving skill of the driver, and to improve the driving skill of a case of driving a vehicle of different kind.

In this case, a speaker mounted on the portable terminal device may be used as the output device 21, or a speaker system of the vehicle coupled to the portable terminal device via a wireless communicator or a wired communication unit may be used as the output device 21. Further, in a case where the driving assistance apparatus 1 is configured as the portable terminal device, for example, a sensor such as an acceleration sensor mounted on the portable terminal device may be used as the vehicle behavior measurement device 11. In this case, in order to accurately estimate the behavior of the vehicle by the sensor, the information processing device 50 may be configured to be able to execute a process of converting an axial direction of the sensor mounted on the portable terminal device into a predetermined direction. For example, in a state in which the vehicle is stopped on a horizontal road, a direction of a gravitational acceleration may be detected by a sensor mounted on the portable terminal device, information about a deviation between the direction of the gravitational acceleration and the axial direction of the sensor may be recorded, and the axial direction of the sensor may be converted into the predetermined direction on the basis of the information about the deviation. Alternatively, upon executing the auditory stimulus outputting process, a process may be performed of guiding the portable terminal device to be mounted in the vehicle in such a manner that the axial direction of the sensor mounted on the portable terminal device corresponds to the longitudinal direction or the lateral direction of the vehicle.

The following modes may also belong to the technical scope of the technology.
(1) The driving assistance apparatus, in which the one or more processors of driving assistance apparatus are configured to vary the auditory stimulus by varying a rhythm or a tempo of the auditory stimulus.
(2) The driving assistance apparatus, in which the auditory stimulus includes a sound of a basic pattern whose rhythm and tempo are constant, and the one or more processors of the driving assistance apparatus are configured to vary the auditory stimulus by varying an output pattern of a sound other than the sound of the basic pattern.

The processor 53 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 53. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 53 illustrated in FIG. 2.

The invention claimed is:
1. A driving assistance apparatus to be applied to a vehicle, the driving assistance apparatus comprising:
one or more processors; and
one or more memories communicably coupled to the one or more processors,
the one or more processors being configured to:
use information indicating behavior of the vehicle to determine, based on a threshold value, that behavior of the vehicle is stable while the vehicle travels for a predetermined time period or a predetermined section;
output an auditory stimulus to a driver who drives the vehicle in response to determining that the behavior of the vehicle is stable; and vary the auditory stimulus every time the behavior of the vehicle is determined to be stable.

2. The driving assistance apparatus according to claim 1, wherein the one or more processors are configured to:
generate command information that causes the auditory stimulus to vary every time the behavior of the vehicle is determined to be stable, and
vary the auditory stimulus on a basis of the command information.

3. The driving assistance apparatus according to claim 2, wherein
in response to determining that the behavior of the vehicle is stable while the vehicle travels for the predetermined time period or the predetermined section, the one or more processors are configured to generate the command information that causes the auditory stimulus to vary, reset the predetermined time period or the predetermined section, and restart determining that the behavior of the vehicle is stable while the vehicle travels another predetermined time period or another predetermined section, and
in response to determining that the behavior of the vehicle is not stable before the vehicle completes traveling for the predetermined time period or the predetermined section, the one or more processors are configured to reset the predetermined time period or the predetermined section and restart determining that the behavior of the vehicle is stable while the vehicle travels the another predetermined time period or the another predetermined section.

4. The driving assistance apparatus according to claim 1, wherein the one or more processors are configured to:
compare an index value with a predetermined threshold, the index value indicating a magnitude of the behavior of the vehicle; and
determine that the behavior of the vehicle is stable in response to determining how many times the index value has exceeded the predetermined threshold while the vehicle travels for the predetermined time period or the predetermined section is less than a predetermined reference.

5. The driving assistance apparatus according to claim 4, wherein the one or more processors are configured to increase a degree of varying the auditory stimulus as a maximum value of the index value decreases in the predetermined time period or the predetermined section.

6. The driving assistance apparatus according to claim 4, wherein the one or more processors are configured to set the predetermined threshold in accordance with a driving skill of the driver.

7. The driving assistance apparatus according to claim 1, wherein
the auditory stimulus comprises a combination of multiple sound sources, and
the one or more processors are configured to vary the auditory stimulus by executing at least one or more of varying respective volumes of the multiple sound sources, varying respective output timings of the multiple sound sources, varying output order of the multiple sound sources, or varying respective pitches of the multiple sound sources.

8. A driving assistance apparatus to be applied to a vehicle, the driving assistance apparatus comprising:
a behavior stability determination unit configured to use information indicating behavior of the vehicle to determine, based on a threshold value, that behavior of the vehicle is stable while the vehicle travels for a predetermined time period or a predetermined section; and
an output control unit configured to:
output an auditory stimulus to a driver who drives the vehicle in response to determining that the behavior of the vehicle is stable; and
vary the auditory stimulus every time the behavior of the vehicle is determined to be stable.

9. A non-transitory recording medium containing a computer program to be applied to a driving assistance apparatus, the computer program causing, when executed by one or more processors, the one or more processors to implement a method, the method comprising:
using information indicating behavior of a vehicle to determine, based on a threshold value, that behavior of the vehicle is stable while the vehicle travels for a predetermined time period or a predetermined section;
outputting an auditory stimulus to a driver who drives the vehicle in response to determining that the behavior of the vehicle is stable; and
varying the auditory stimulus every time the behavior of the vehicle is determined to be stable.

* * * * *